United States Patent [19]

Kinjo

[11] Patent Number: 4,604,667
[45] Date of Patent: Aug. 5, 1986

[54] RECORDING MEDIUM FOR RECORDING AND/OR REPRODUCING APPARATUS

[75] Inventor: Hisao Kinjo, Yokohama, Japan

[73] Assignee: Victor Company of Japan, Ltd., Yokohama, Japan

[21] Appl. No.: 436,418

[22] Filed: Oct. 25, 1982

[30] Foreign Application Priority Data

Oct. 27, 1981 [JP] Japan ............................. 56-171868
Aug. 2, 1982 [JP] Japan ............................. 57-134930

[51] Int. Cl.⁴ ............................................ G11B 5/004
[52] U.S. Cl. ................................. 360/100; 358/906
[58] Field of Search .................. 360/100, 87; 358/906

[56] References Cited

U.S. PATENT DOCUMENTS

| 2,251,680 | 9/1941 | La Forest . | |
|---|---|---|---|
| 3,145,386 | 8/1964 | Wadey et al. . | |
| 3,697,968 | 10/1972 | Low | 360/100 |
| 3,747,080 | 7/1973 | Taylor . | |
| 4,241,405 | 12/1980 | Allocca | 360/100 X |
| 4,412,260 | 10/1983 | Stricklin | 360/97 |

FOREIGN PATENT DOCUMENTS

| 714187 | 9/1968 | Belgium . |
|---|---|---|
| 132732 | 4/1900 | Fed. Rep. of Germany . |
| 1018246 | 10/1957 | Fed. Rep. of Germany . |
| 1185837 | 1/1965 | Fed. Rep. of Germany . |
| 1802461 | 10/1968 | Fed. Rep. of Germany . |
| 1812857 | 12/1968 | Fed. Rep. of Germany . |
| 340387 | 7/1904 | France . |
| 1241766 | 8/1960 | France . |
| 1350975 | of 1964 | France . |
| 1511229 | 1/1968 | France . |
| 1532726 | 7/1968 | France . |
| 4300 | of 1914 | United Kingdom . |
| 316595 | 7/1929 | United Kingdom . |
| 442112 | 2/1936 | United Kingdom . |
| 717113 | 10/1954 | United Kingdom . |
| 784571 | 10/1957 | United Kingdom . |
| 882250 | 11/1961 | United Kingdom . |
| 943263 | 12/1963 | United Kingdom . |
| 833127 | 1/1968 | United Kingdom . |
| 1260239 | 7/1968 | United Kingdom . |
| 1347316 | 2/1974 | United Kingdom . |
| 1482668 | 8/1974 | United Kingdom . |
| 1424044 | 2/1976 | United Kingdom . |

OTHER PUBLICATIONS

IBM TDB; vol. 13, No. 11, Apr. 1971, p. 3388; Truncated Cone Storage Device; H. E. Amrine & D. F. Dean.
IBM Technical Disclosure Bulletin, vol. 11, No. 10, Armonk, N.Y. USA; D. D. Decker; "Magnetic Disc Retainer"—Mar., 1969.
IBM Technical Disclosure Bulletin, vol. 19, No. 7, pp. 2684–2685, Armonk, N.Y. (USA) 9/5/41.
Patents Abstracts of Japan, vol. 3, No. 121(E–143), Oct. 11, 1979, pp. 157 E 143 and JP-A-54 99 609.
Patent Abstracts of Japan, vol. 4, No. 184 (P-41) 666 Dec. 18, 1980, and JP-A-55 125 585.

*Primary Examiner*—A. J. Heinz
*Attorney, Agent, or Firm*—Roberts, Spiecens & Cohen

[57] ABSTRACT

A recording medium is used in a recording and/or reproducing apparatus comprising a rotational motor and a recording and/or reproducing circuit. The recording medium comprises a main body having a substantially cylindrical part, and a hollow part open at least at one end thereof, a recording surface formed at least on a peripheral surface of the cylindrical part, and a coupling part provided at the main body and to be coupled to the motor. The recording medium is loaded into the recording and/or reproducing apparatus in a state where at least a part of the motor is relatively inserted into the hollow part.

8 Claims, 48 Drawing Figures

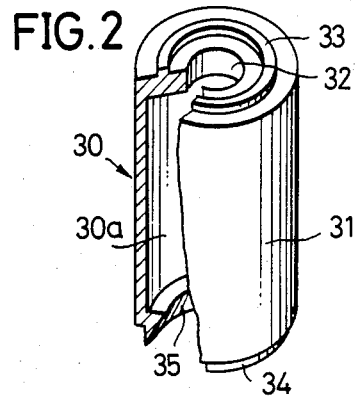
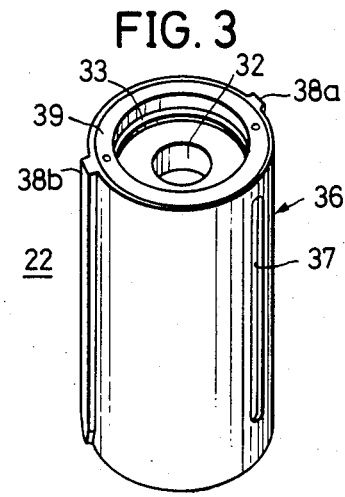
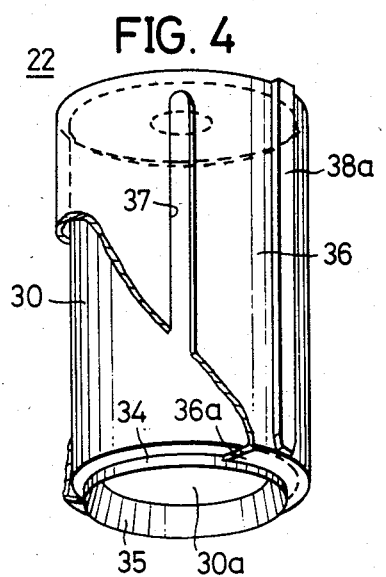
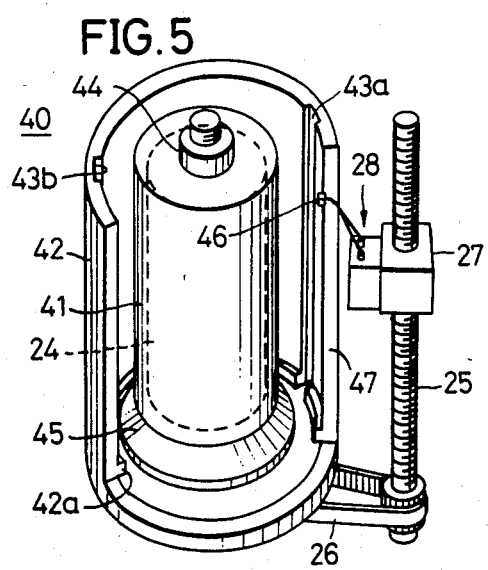
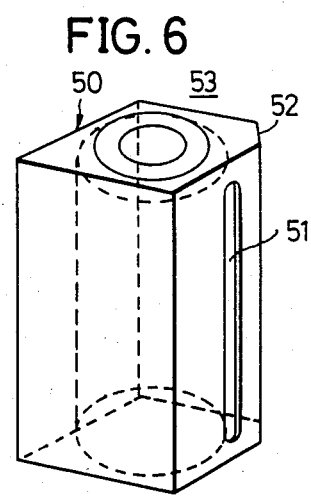

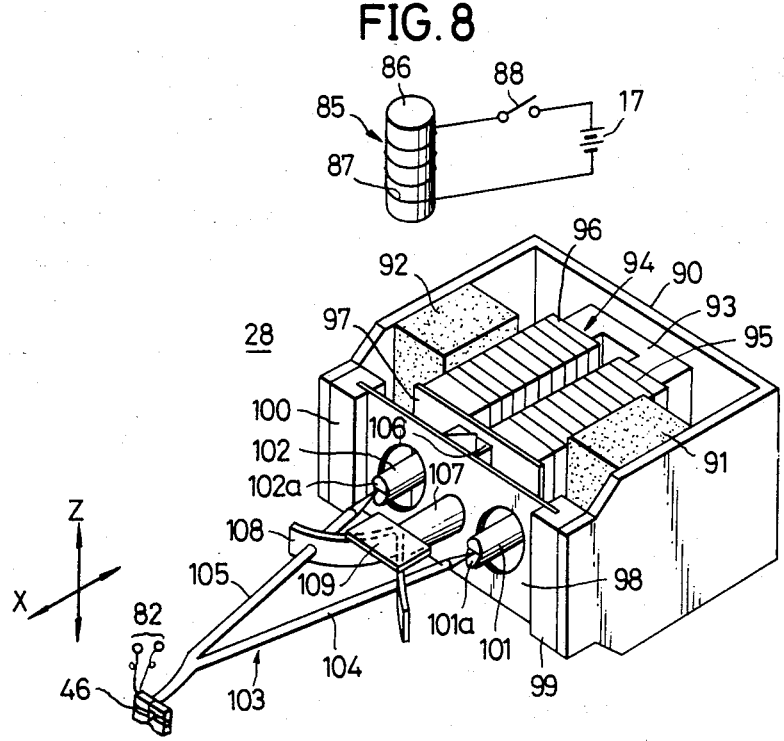
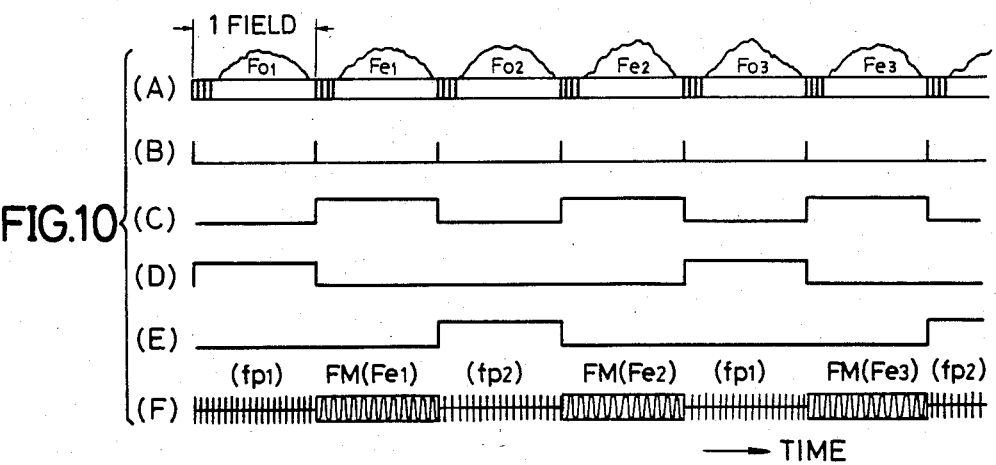

RECORDING MEDIUM FOR RECORDING AND/OR REPRODUCING APPARATUS

BACKGROUND OF THE INVENTION

The present invention generally relates to recording mediums for recording and/or reproducing apparatuses, and more particularly to a hollow and substantially cylindrical-shaped recording medium suitable for use in an image pickup recording and/or reproducing apparatus such as a so-called electronic camera.

Recently, in addition to efforts for reducing the size of a video signal magnetic recording and reproducing apparatus (so-called video tape recorder, and hereinafter simply referred to as a VTR), attempts have been made to reduce the size of an image pickup camera by combining a solid-state pickup element such as a charge coupled device (CCD) with integrated circuit (IC) technology. That is, a compact and light-weight apparatus referred to as an electronic 8 mm device, unitarily comprising the VTR and the camera, has been proposed.

The above electronic 8 mm device has an advantage over the so-called conventional 8 mm movie camera using an optical 8 mm film, in that the picked up and recorded information can be reproduced on a television receiver immediately after the recording. In addition, the above electronic 8 mm device employs a magnetic tape using a metal-particle type magnetic material formed by a new magnetic layer forming technique, and a metal type head, to realize a greater recording density compared to the recording density of the conventional VTR, and the overall size of the whole device is reduced. The electronic 8 mm device essentially employs the recording and reproducing principle of a helical scan type VTR using a magnetic tape and rotary heads. Accordingly, although the electronic 8 mm device can carry out uninterrupted recording of moving pictures, without replacing once loaded roll of medium, longer than that of the 8 mm movie camera, the electronic 8 mm device has the following disadvantages.

(1) Normal recording of the moving pictures can be carried out, but a so-called still-picture-frame recording in units of fields or frames cannot be carried out.

(2) In relation to paragraph (1) above, recording in terms of picture frames wherein some randomly selected frames are replaced by new frames, and a random access reproduction, cannot be carried out.

(3) A rotary drum provided with video heads, a tape loading mechanism for drawing out the tape from a tape cassette and loading the tape unto a predetermined tape path, a tape travel driving mechanism for causing the tape to travel through the predetermined tape path, and the like, are essential to the electronic 8 mm device, and it is difficult to achieve substantial reduction in size and weight of the mechanical structure.

(4) The limit of the track pitch upon high density recording is in the order of 20 μm from the practical point of view because the tape slightly deviates upwards and downwards while traveling on the tape path, and there is a limit in the size reduction of the electronic 8 mm device due to the fact that fine quality recording and reproduction cannot be maintained if the track pitch is further reduced.

(5) It is difficult to obtain tracking by swinging technology of the rotary heads, because the track pitch is narrow as described above.

On the other hand, a so-called electronic camera which records the video signal onto a single side of a flexible magnetic disc, has been proposed as a potential replacement of the still picture camera using an optical 35 mm film. In this electronic camera, a magnetic disc having a diameter in the order of 35 mm, for example, is rotated at a rotational speed of 3600 rpm within a main camera body having a size in the range of a normal 35 mm single-lens reflex camera. The video signal obtained by picking up an image by a solid-state pickup element such as a CCD is recorded magnetically onto the magnetic disc by a magnetic head. The magnetic head carries out recording in terms of one field for one revolution of the magnetic disc, and is successively moved along the radial direction of the magnetic disc. However, this electronic camera also suffers the following disadvantages.

(a) Because the magnetic disc is used as a recording medium and the picture of one picture frame is recorded for one revolution of the magnetic disc, the magnetic disc is rotated at a constant angular speed. Hence, the relative linear speed between the magnetic head and the magnetic disc becomes smaller towards the inner periphery of the magnetic disc. Thus, in order to carry out recording in a normal manner, the central area of the magnetic disc is unusable and wasted, and the recording range is accordingly limited. On the other hand, there is a limit to the diameter of the magnetic disc because the size of the main camera body is limited. Therefore, the effective recording area of the magnetic disc cannot be made large, and the recording capacity thus cannot be made large.

(b) In relation to paragraph (a) above, the picture quality of the recorded picture becomes poor towards innermost part of the disc whereat the relative linear speed between the magnetic head and the magnetic disc is small.

(c) A standing wave is likely to be introduced at the outermost periphery of the rotating magnetic disc because the magnetic disc comprises a flexible magnetic sheet such as a floppy disc. Hence, a flutter phenomenon may be observed on the magnetic disc due to the above standing wave, and the magnetic head cannot make stable contact with the magnetic disc. As a result, the outermost peripheral part of the disc which is most usable. whereat the relative linear speed between the magnetic head and the magnetic disc becomes large, cannot be utilized.

On the other hand, a concept was conventionally known to construct a recording and reproducing apparatus which uses a cylindrical-shaped rotary magnetic drum as a magnetic recording medium. In this apparatus which uses the magnetic drum, the relative linear speed between the magnetic head and the magnetic drum is constant regardless of the position of the magnetic head. However, the size of the recording and reproducing apparatus becomes large, because the recording capacity of the magnetic drum is not as large as the magnetic tape, and the size and volume of the magnetic drum is large. In addition, the handling of the magnetic drum is troublesome since the entire cylindrical surface of the magnetic drum is magnetic. Moreover, it is difficult to manufacture a magnetic drum comprising a good quality uniform magnetic surface. Therefore, the magnetic recording and reproducing apparatus using the magnetic drum was not reduced to practice, for the above described reasons.

SUMMARY OF THE INVENTION

Accordingly, it is a general object of the present invention to provide a novel and useful recording medium for recording and/or reproducing apparatus in which the above described disadvantages have been overcome.

Another and more specific object of the present invention is to provide a substantially cylindrical-shaped compact recording medium for use in a so-called electronic camera type image pickup recording and/or reproducing apparatus. The recording medium according to the present invention has a hollow substantially cylindrical-shape opening at one end thereof, and a driving motor of the image pickup recording and/or reproducing apparatus relatively enters within the hollow part of the recording medium. Hence, the recording medium can easily be confined within a main apparatus body having a size in the range of a conventional 35 mm single-lens reflex camera, and operated, for example. In addition, the relative linear speed between a recording and reproducing transducer and the recording medium is substantially constant regardless of the position of the recording and reproducing transducer on the recording medium. Thus, a reproduced picture of the same picture quality can be maintained throughout the entire recording surface of the recording medium. Furthermore, the recording capacity of the recording medium according to the present invention is larger compared to the previously described magnetic disc, if the available recording area of the medium is taken into account.

Still another object of the present invention is to provide a recording medium for an image pickup recording and/or reproducing apparatus, which is of a cartridge type, and a hollow substantially cylindrical-shaped magnetic drum having an opening at one end thereof is accommodated within a hollow substantially cylindrical-shaped case having an opening at one end thereof. According to the recording medium of the present invention, the magnetic surface of the recording medium is protected by the case, and the handling of the recording medium is facilitated in that there is no need for special care upon handling.

Another object of the present invention is to provide a recording medium for an image pickup recording and/or reproducing apparatus, having a hollow circular truncated conical-shape. According to the recording medium of the present invention, the recording medium can be manufactured with ease. The main recording medium body in particular can be molded from a synthetic resin, and a magnetic layer can easily be formed around the periphery of the main recording medium body.

Other objects and further features of the present invention will become apparent from the following detailed description when read in conjunction with the accompanying drawings.

BRIEF DESCRIPTION OF THE DRAWINGS

FIG. 2 is a perspective view, with a part cut away, showing a magnetic drum part of a first embodiment of a recording medium according to the present invention;

FIG. 3 is a perspective view showing an embodiment of a cartridge accommodating the magnetic drum shown in FIG. 2 within a case;

FIG. 4 is a perspective view from the bottom, with a part cut away, showing the cartridge shown in FIG. 3;

FIG. 5 is a perspective view, with a part cut away, showing a drive assembly within the apparatus shown in FIG. 1;

FIG. 6 is a perspective view showing another example of a case of the magnetic drum cartridge;

FIG. 8 is a perspective view, with a part cut away, showing an embodiment of a magnetic head within the apparatus shown in FIG. 1;

FIGS. 10(A) through 10(F) are graphs, respectively showing signal waveforms at each part of the block system shown in FIG. 9;

DETAILED DESCRIPTION

Figure 1:
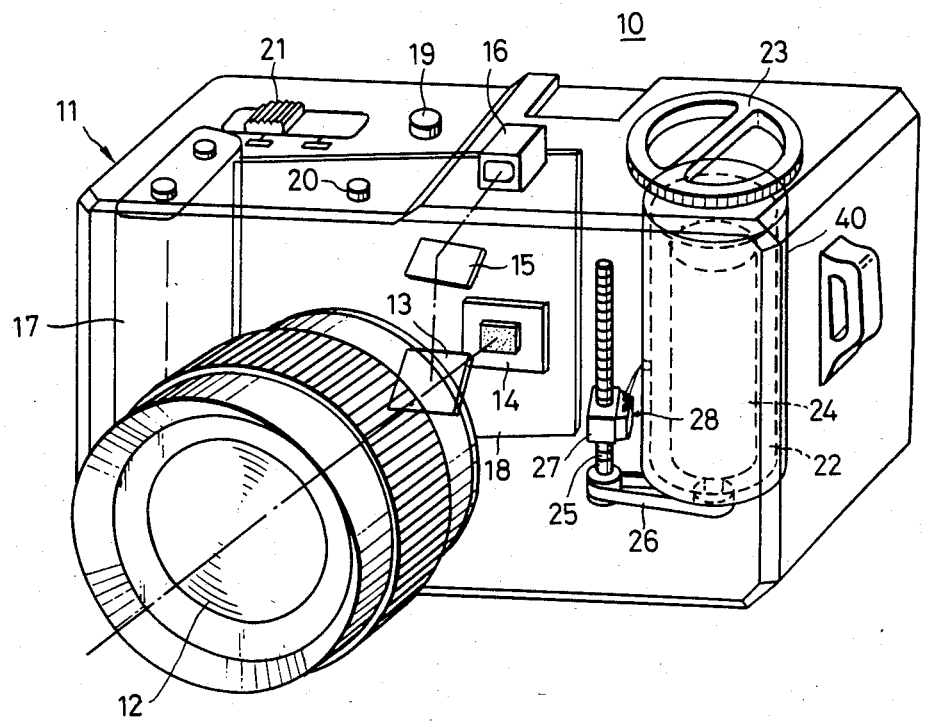
FIG. 1 is a perspective view showing an embodiment of an image pickup recording and/or reproducing apparatus which is loaded with a recording medium according to the present invention.

First, general description will be given with respect to an embodiment of an image pickup recording and/or reproducing apparatus with respect to which a recording medium according to the present invention is used. An image pickup recording and/or reproducing apparatus 10 comprises an external frame 11 which has a shape generally similar to a 35 mm single-lens reflex camera. Although the external frame 11 is shown in a perspective view as a transparent frame for convenience' sake in order to explain the inner construction thereof, the external frame 11 is actually opaque. Light from an object (not shown) which is to be image picked up and recorded passes through a lens system 12 and a half mirror 13, and is then projected to a solid-state pickup element 14 comprising a CCD, for example. The light thus projected to the pickup element 14 is converted into a video signal. A part of the light which is passed through the lens system 12 is reflected at the half mirror 13 to reach a view finder 16 after being further reflected at a mirror 15. A battery 17 is a power source to a printed circuit device 18 provided with the image pickup element 14, a motor 24 which will be described hereinafter, and the like. Similarly as in a normal camera, a shutter button 19, a release button 20, and an operation switch 21 are provided on the upper surface of the external frame 11.

A magnetic drum cartridge 22 is loaded into or unloaded from a drive assembly 40 within the apparatus 10, by opening a lid 23. The cartridge 22 is hollow, and the motor 24 is relatively inserted within the cartridge 22 in its loaded state, as will be described hereinafter. A feed screw 25 is rotated by the motor 24 by way of a belt 26. A feed nut 27 is screwed onto the feed screw 25, and a magnetic head device 28 is mounted on the nut 27. The magnetic head device 28 moves upwards or downwards as the feed screw 25 rotates.

The above cartridge 22 has a shape shown in FIGS. 3 and 4, for example. A first embodiment of a magnetic drum 30 within the cartridge 22 has a shape shown in FIG. 2. The magnetic drum 30 is of a hollow cylindrical-shape comprising a hollow part 30a which has an open lower end. A magnetic layer covers the outer peripheral surface of the magnetic drum 30, to form a magnetic surface 31. A mounting hole 32 is provided at the central upper surface of the magnetic drum 30. A ring-shaped projection 33 having a diameter greater than that of the mounting hole 32, is formed at the upper surface of the magnetic drum 30. A small diametral part 34 having a diameter slightly smaller than the outer diameter of the magnetic surface 31, is provided on the outer surface of the magnetic drum 30 at the lower end part thereof, to provide a step part. In addition, a tapered surface 35 is formed on the inner surface of the magnetic drum 30 at the lower end part thereof.

As shown in FIGS. 3 and 4, the above magnetic drum 30 is accommodated within a case 36, to constitute the magnetic drum cartridge 22. The magnetic drum 30 is loaded and unloaded with respect to the apparatus 10 in a state accommodated within the case 36, and thus, there is no direct contact between the operator's hands and the magnetic surface 31, and dust particles and the like are prevented from adhering onto the magnetic surface 31. A window 37 is formed along the longitudinal direction of the case 36, that is, along a direction parallel to the axial core of the magnetic drum 30. Ribs 38a and 38b are formed on the outer surface of the case 36, along the longitudinal direction thereof. A holding cap 39 is provided on the inner periphery at the upper end of the case 36. A flange part 36a bent towards the inner peripheral direction, is formed on the lower end part of the case 36. When assembling the cartridge 33, the magnetic drum 30 is inserted into the case 36 from above in a state where the holding cap 39 is removed so that the magnetic drum 30 is accommodated within the cartridge 22, and the holding cap 39 is thereafter mounted. The magnetic drum 30 is prevented from slipping upwards out of the cartridge 22 by the holding cap 39, and prevented from slipping downwards out of the cartridge 22 by the engagement with the step part formed by the small diametral part 34 and the flange part 36a of the case 36.

When the cartridge 22 operates in a state loaded into the drive assembly 40 as will be described hereinafter, the case 36 remains stationary and only the magnetic drum 30 rotates. Thus, the outer diameter and length of the magnetic drum 30 are set smaller than those of the case 36. Hence, by taking into account the error introduced in positioning the magnetic drum 30 along the radial direction and the thrust direction upon loading, there is play between the magnetic drum 30 and the case 36. However, in order to prevent damage to the magnetic surface 31 of the magnetic drum 30 upon handling of the cartridge 22, the above play between the magnetic drum 30 and the case 36 must be selected so that there is no contact between the magnetic surface 31 and the inner peripheral surface of the case 36.

The present inventor has devised possible means for: (1) preventing rotation or play in the magnetic drum 30 by engaging a cam-shaped finger with the magnetic drum 30 or providing a pushing spring with respect to the magnetic drum 30; (2) providing a suitable cushion member at the inner surface of the case 36; (3) shaping the magnetic drum 30 so that the magnetic surface 31 does not make direct contact with the case 36; and the like, in a state where the cartridge 22 is not loaded into the drive assembly 40. The means (3) is employed in the above described embodiment, by taking into account the manufacturing ease, the manufacturing cost, and the like. That is, the movement of the magnetic drum 30 in the radial direction is restricted by the contact between the small diametral part 34 and the flange part 36a, and the contact between the ring-shaped projection 33 and the holding cap 39. The magnetic surface 31 of the magnetic drum 30 is accordingly separated from the inner peripheral surface of the case 36, due to the above structure. Accordingly, the magnetic surface 31 does not make rubbing contact with the case 36. In addition, the play in the magnetic drum 30 along the thrust direction is restricted by the above construction which prevents the magnetic drum 30 from slipping out of the case 36 in the upward and downward directions.

As shown in FIG. 5, the drive assembly 40 of the apparatus 10 generally comprises the motor 24, a drum holder 41, and a hollow cylindrical-shaped case holder 42. When loading the cartridge 22 into the drive assembly 40, the drum holder 41 is relatively inserted within the hollow part 30a of the magnetic drum 30. Moreover, the case 36 is inserted within the case holder 42 in a state where the projections 38a and 38b on the case 36 engage with guide grooves 43a and 43b of the case holder 42, as the case 36 is inserted within the hollow part of the case holder 42 together with the insertion of the cartridge 22 into the drive assembly 40 from above the drive assembly 40. A set screw 44 which fits within the mounting hole 32 of the magnetic drum 30, projects from the central upper surface of the drum holder 41. A tapered surface 45 is formed on the lower part of the drum holder 41.

A part of the case holder 42 is cut out along the longitudinal direction (a direction parallel to the axial core) to form a cutout 47, and the magnetic head 46 of the magnetic head device 28 is positioned opposing a cutout 47. The case 36 is inserted in a direction so that the window 37 opposes the magnetic head 46 through the cutout 47, by the positioning provided by the projections 38a and 38b and the guide grooves 43a and 43b. It is not essential to provide two pairs of these projections and guide grooves, and it is sufficient to provide only one pair of projection and guide groove. When providing two pairs of projections and guide grooves as in the above described embodiment, it is desirable to provide the projections and guide grooves at positions deviated from diametrical positions in order to prevent insertion of the case 36 in the reverse direction. The relationship between the above projections and guide grooves may be opposite, that is, the projections may be provided on the case holder 42 and the guide grooves may be provided in the case 36.

As will be described hereinafter, the magnetic drum 30 of the cartridge 22 loaded into the drive assembly 40, is rotated together with the drum holder 41 by the motor 24. The magnetic head 46 of the magnetic head device 28 is fed continuously or intermittently by the feed screw 25 and the feed nut 27. As a result, an information signal such as the video signal is recorded and reproduced with respect to the magnetic surface 41 by the magnetic head 46 on spiral or concentric tracks.

Next, description will be given with respect to an embodiment showing practical size and rotational speed of the magnetic drum 30.

When taking into consideration the fact that the size of the external frame of the apparatus 10 shown in FIG. 1 is to be in the range of the existing 35 mm optical camera, it is desirable for the size of the magnetic drum 30 to be in the range of a patronat of the existing 35 mm film (47 mm in length and 25 mm in diameter) or in the range of a patronat case which accommodates the above patronat (53 mm in length, 31 mm in case diameter, and 34 mm in cap diameter).

On the other hand, in the portable type VTR for home use which is presently most popular throughout the world, the diameter of a drum provided with two rotary heads is selected to 62 mm, and the rotational speed of the drum is selected to 30 rps. Thus, the relative linear speed between the magnetic tape and the heads is selected to 5.8 m/sec. Fine quality recording and reproduction of the video signal is realized by selecting the relative linear speed between the magnetic recording medium and the heads to the above value.

As a preferable embodiment, if the relative linear speed between the magnetic surface 31 of the magnetic drum 30 and the magnetic head 46 is selected to 5.8 m/sec, the diameter and the rotational speed of the magnetic drum 30 are respectively set to 31 mm and 60 rps. In addition, if the length of the magnetic drum 30 is selected in the range of 50 mm, the size as a whole can be set to a size substantially the same as that of the patronat case of the 35 mm film.

Next, description will be given with respect to the features of the magnetic drum 30, in comparison with the magnetic drum used in the previously described electronic camera. If the diameter and rotational speed of the magnetic drum 30 are respectively selected to 31 mm and 60 rps (3600 rpm), the relative linear speed of 5.8 m/sec is obtained between the magnetic drum 30 and the magnetic head 46. Thus, one field of the television video signal which is picked up, can be recorded for one revolution of the magnetic drum 30. Moreover, because the diameter of the magnetic drum 30 is substantially the same throughout the entire length of the magnetic surface 31 (50 mm of length in the above example), the relative linear speed is maintained same, and the recording and reproduction can effectively be carried out with the same performance characteristic throughout the entire length of the magnetic surface 31. If an electronic tracking technique is applied with respect to the magnetic head 46, the recording and reproduction may be carried out on a narrow track wherein the track width is 3 $\mu$m and the guard band is 1.5 $\mu$m (track pitch of 4.5 $\mu$ml, for example. Accordingly, if the moving range of the magnetic head 46 with respect to the magnetic surface 31 having a length of 50 mm is selected to 48.6 mm, for example, 48.6 mm/4.5 $\mu$m = 10,800 tracks can be formed on the magnetic drum 30. Therefore, when recording and reproducing still pictures, more than 10,000 picture frames of still pictures can be recorded and reproduced. On the other hand, when continuously recording and reproducing motion pictures to carry out normal recording and reproduction, 10,800/60 × 60 = 3, that is, three minutes of full-field normal recording and reproduction can be carried out. If a so-called field-skip recording is carried out wherein the recording is carried out for every second field, six minutes of recording and reproduction can be carried out because there are thirty picture frames per second in this case.

In the conventional 8 mm film camera, there are sixteen picture frames per second, and the pickup time or playback duration of one roll of film is three minutes. Hence, according to the recording medium of the present invention, an information quantity twice that of the 8 mm film can be recorded for a given time or duration even if the field-skip recording is carried out. Furthermore, the recording duration becomes twice that of the 8 mm film. Accordingly, the recording medium according to the present invention may not only be used instead of the conventional 35 mm still picture camera, but may even replace the conventional 8 mm film camera.

On the other hand, if a performance equivalent to the performance of the magnetic drum of the present invention was demanded with respect to the magnetic disc of the previously described electronic camera, the diameter of the above innermost peripheral position on the magnetic disc would become equal to 31 mm in order to obtain a relative linear speed of 5.8 m/sec between the magnetic disc and the magnetic head. Thus, in order to obtain the above recording capacity by starting the recording from the innermost peripheral position on the magnetic disc, a recording range of 50 mm along the radial direction of the magnetic disc would be required from the innermost peripheral position, and the diameter at the outermost peripheral position would be equal to 131 mm as a result. However, it is impossible to accommodate a magnetic disc having such a large diameter within a frame body having a size in the range of the 35 mm camera. Conversely, if the size of the magnetic disc is selected so that the magnetic disc can be accommodated within the frame body having the size in the range of the 35 mm camera, the relative linear speed between the magnetic disc and the magnetic head is reduced, and great reduction is introduced in the recording capacity as compared to the magnetic drum of the present invention. It can be clearly understood from the above description that the magnetic drum of the present invention is superior when carrying out the recording and reproduction in a state where the magnetic drum is accommodated within the frame body having a size in the range of the 35 mm camera.

It is not essential for the case of the magnetic drum cartridge to have a cylindrical-shape as long as the magnetic drum 30 can rotate therein, and a substantially parallelepiped-shaped case 50 shown in FIG. 6 may be used. In this case, a window 51 similar to the above window 37 is provided in the case 50, and a cutout 52 is provided at one corner part of the case 50, for positioning. A case holder of a drive assembly which is loaded with a magnetic drum cartridge 53 having the above construction, is formed in a hollow substantially parallelepiped-shape so that the case 50 can be inserted therein.

Figure 7:
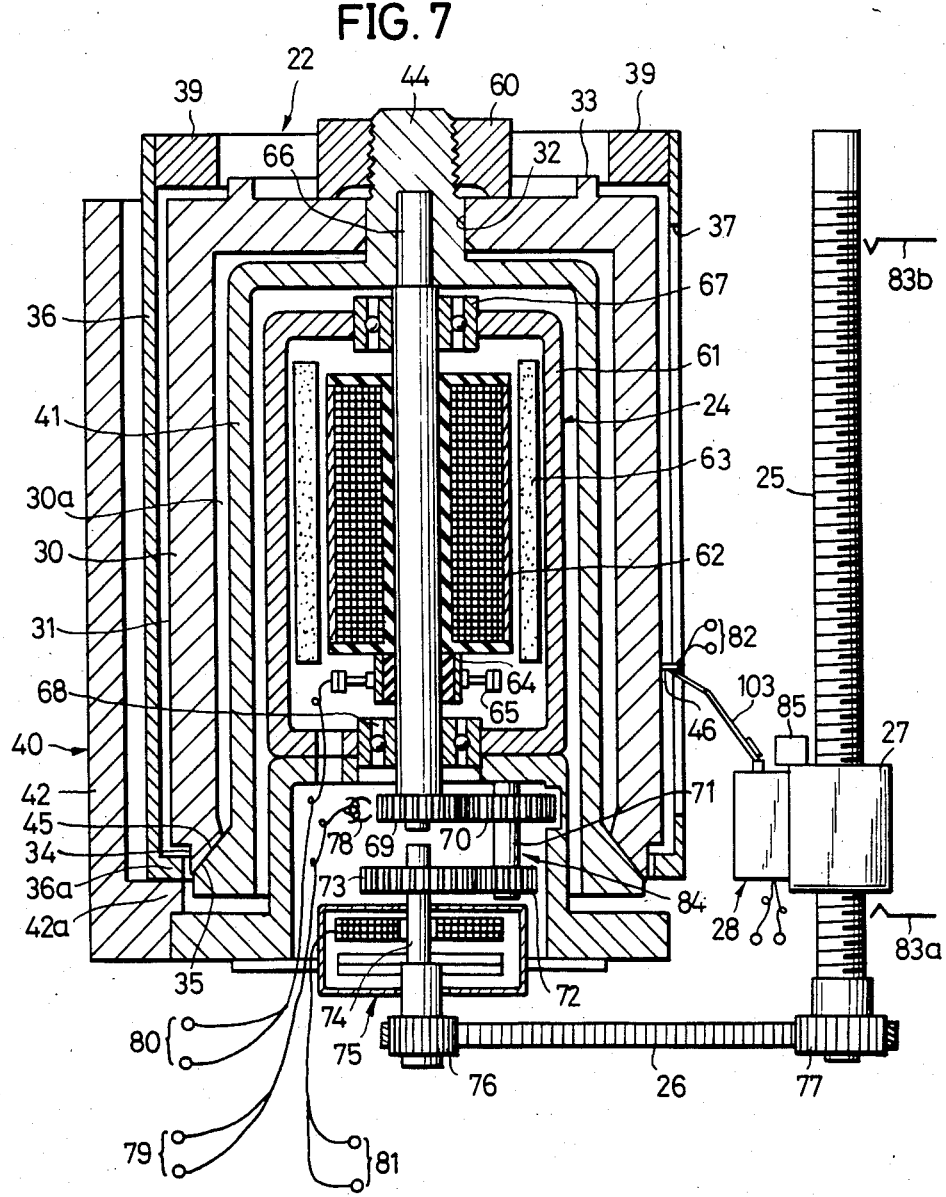
FIG. 7 is a side view in vertical cross section, showing a state where the recording medium according to the present invention is loaded within the drive assembly shown in FIG. 5.

FIG. 7 is an enlarged view in cross section showing a state where the cartridge 22 is loaded into the drive assembly 40. As described above, in the state where the cartridge 22 is loaded into the drive assembly 40, the case 36 rests on and is supported by a step part 42a of the case holder 42. Further, the tapered surface 35 at the lower end of the magnetic drum 30 rests on the tapered surface 45 of the drum holder 41. The set screw 44 penetrates through the mounting hole 32 in the magnetic drum 30, and the magnetic drum 30 is mounted onto the drum holder 41 by a nut 60. In this state, the magnetic drum 30 does not make contact with the case 36, that is, separated from the inner peripheral surface of the case 36, and is rotatable therein together with the drum holder 41. Here, even if the magnetic drum 30 is given a certain thickness for mechanical strength, the inner diameter of the hollow part 30a of the magnetic drum 30 can still be 20 mm when the diameter of the magnetic surface 31 is set to 31 mm, and further, the length of the hollow part 30a can be in the range of 45 mm.

The motor 24 is provided within the drum holder 41. D.C. motors such as an inner rotor motor, outer rotor motor, a cup motor, Hall element motor, print motor, and brushless motor, may be used as the motor 24. The motor 24 comprises a rotor (armature) 62 accommodated within a motor casing 61, a field magnet 63, a commutator 64, a brush 65, and a rotary shaft 66 mounted with the rotor 62. The rotary shaft 66 is axially supported by bearings 67 and 68 which are mounted on the motor casing 61, and the upper end of the rotary shaft 66 is embeddedly fixed to the drum holder 41. Accordingly, the drum holder 41 is rotated with the rotary shaft 66.

A gear 69 is fixed to the lower end of the rotary shaft 66. The rotary shaft 66 rotates a shaft 74, through gears 69 and 70, a shaft 71, and gears 72 and 73. The above gears 69, 70, 72, and 73 constitute a speed reduction mechanism 84. The shaft 74 rotates an output shaft 76 through an electromagnetic clutch 75. A belt is stretched across between the output shaft 76 and a pulley 77 which is provided on the lower end of the feed screw 25.

A pickup head 78 of a frequency generator is provided at a position opposing the gear 69, and an output signal generated by the rotation of the gear 69 is obtained through a terminal 79. This output signal is used for rotational control. A driving voltage from a terminal 80 is supplied to the brush 65 of the motor 24, and a driving voltage from a terminal 81 is supplied to the electromagnetic clutch 75. In addition, a recording signal is supplied to the magnetic head 46 from a terminal 82, and a reproduced signal is obtained from this magnetic head 46.

When the driving voltage from the terminal 80 is supplied to the brush 65 to energize the motor 24, the rotary shaft 66 rotates, and the magnetic drum 30 rotates unitarily with the drum holder 41 at a rotational speed of 60 rps (3600 rpm). The recording and/or reproduction with respect to the magnetic surface 31 is carried out by the magnetic head 46. Further, when the electromagnetic clutch 75 is activated by supplying the driving voltage from the terminal 81 thereto, the rotational speed of the rotary shaft 66 is reduced to 1/1000 the original speed by the above speed reduction mechanism, and the feed screw 25 is rotated by way of the belt 26. The magnetic head device 28 is thus moved upwards or downwards unitarily with the feed nut 27, due to the rotation of the feed screw 25. The speed reducing ratio of the speed reduction mechanism 84, the rotation transmitting ratio with respect to the pulley 77, the screw pitch of the feed screw 25, and the like, are set so that the magnetic head 46 is fed by one track pitch for one revolution of the magnetic drum 30.

When continuously recording and reproducing moving pictures, the feed screw 25 is rotated continuously if the electromagnetic clutch 75 is operated continuously, and the magnetic head 46 is accordingly moved continuously. Hence, at this point, the video signal is continuously recorded onto or reproduced from a spiral track on the magnetic surface 31 of the magnetic drum 30. In addition, when carrying out a still-picture-frame recording or reproduction, the above electromagnetic clutch 75 is activated intermittently. If the construction is such that the recording is carried out during the deactivated state of the electromagnetic clutch 75, concentric tracks are formed on the magnetic surface 31, and the spiral track is formed on the magnetic surface 31 if the construction is such that the recording is carried out during the activated state of the electromagnetic clutch 75.

Limit switches 83a and 83b which make contact with the feed nut 27, are provided on the feed screw 25 so as to limit the feeding range limit of the magnetic head device 28. When the magnetic head device 28 is fed upwards from a lower position while carrying out recording or reproduction and reaches an upper limit position of the feeding range, the limit switch 83b is operated by the feed nut 27, and the magnetic head device 28 is returned to the lower position. The downward feeding of the magnetic head device 28 is stopped when the limit switch 83a is operated by the feed nut 27.

If there is a possibility of leakage magnetic field from the field magnet 63 to the magnetic drum 30 by using the motor shown in FIG. 7 having the field magnet 63 as the motor 24, soft-iron and the like may be used for the motor casing 61 and/or the drum holder 41 to block the magnetic field. However, according to the experimental results obtained by the present inventor for a trial manufacture, no problems were observed from the practical point of view even if a non-magnetic aluminum was used for the motor casing 61 and the drum holder 41.

As an embodiment of a manufacturing method of the magnetic drum 30, aluminum or plastic is molded and the center axial line of the hollow part assumes the center line of rotation to abrasively finish the outer peripheral surface with high accuracy to form a magnetic drum base. A thin magnetic layer of metal, alloy, oxide, permalloy, amorphous, and the like is deposited onto the outer peripheral surface of the magnetic drum base by vacuum deposition, and the magnetic surface 31 is formed by ion-plating, sputtering, electroplating, or electroless plating.

When the magnetic drum 30 having a hollow cylindrical-shape open on one end (lower end) is loaded into the drive assembly 40, the construction is such that the drum driving mechanism comprising the motor 24, the drum holder 41, and the like enter within the hollow part 30a of the magnetic drum 30. For this reason, the size of the apparatus as a whole can be made considerably compact.

Next, description will be given with respect to an embodiment of the magnetic head device 28 by referring to FIG. 8. A frame member 90 is formed by bending a magnetic material into a substantially U-shape. Permanent magnets 91 and 92 are fixed to inner sides of arm portions of the frame member 90, and a U-shaped yoke 93 is fixed onto the base part of the frame member 90 between the permanent magnets 91 and 92. A moving body 94 comprises a pair of coils 95 and 96 wound in a rectangular form. Each of the coils 95 and 96 respectively are adjacent to a stiff support plate 97 and are fixed thereto. A leaf spring 98 made of phosphor bronze, for example, is provided across between tip ends of the arm portions of the frame member 90, in a state where both sides of the leaf spring 98 are respectively supported by rubber supports 99 and 100. Pivot bearings 101 and 102 respectively having one end thereof fixed to the support plate 97, penetrate through a pair of openings provided in the leaf spring 98. V-shaped grooves 101a and 102a are formed in the other end of the respective pivot bearings 101 and 102.

The magnetic head 46 is provided at the tip end of a cantilever 103. The cantilever 103 comprises two long and narrow rods 104 and 105 fixed at the tip end thereof in a V-shape. Conical-shaped pivots 104a and 105a of made of a hard material are provided at respective legs of the rods 104 and 105. A cubical rubber block 106 is provided at a central part of the support plate 97, in a state where one surface thereof is adhered to the support plate 97 and another surface thereof is adhered to the leaf spring 98.

A stylus pressure applying member 107 is made of rubber having a truncated conical-shape, and is fixed to a central position of the leaf spring 98. A connecting force applying member 108 made of rubber plate is fixed to the tip end of the stylus pressure applying member 107. The rods 104 and 105 penetrate respective ends of the member 108, and are fixed to the member 108 at these penetrating points. In addition, the member 108 is forcibly bent in a substantially V-shape. Hence, the cantilever 103 receives a force urging displacement towards the moving body 94 due to a resilient restoration force exerted by the bent member 108. Moreover, the pivots 104a and 105a are in pressing contact with respective V-shaped grooves 101a and 102a. Further, a predetermined contacting pressure is applied to the magnetic drum 30 from the magnetic head 46, by a resilient force of the member 107 obtained through the member 108 and the cantilever 103.

The displacement of the moving body 94 due to a control signal current is faithfully transmitted to the cantilever 103, through the pivot bearings 101 and 102 and the pivots 104a and 105a. Accordingly, the magnetic head 46 is displaced in the direction of an arrow X and a tracking control operation is accurately performed. There is no need for the above members 107 and 108 to be independent members, and these members 107 and 108 may be formed unitarily.

The magnetic head device 28 is mounted onto the feed nut 27, so that the feeding direction of the magnetic head device 28 coincides with a substantially longitudinal direction of the cantilever 103, that is, the direction of the arrow X. The magnetic head 46 can be fed firmly because the mechanical strength of the cantilever 103 along its longitudinal direction is high.

A metal piece 109 is attracted to the member 108. Although shown separately in FIG. 8, an electromagnet 85 comprising a coil 87 wound around a core 86, is provided adjacent to the metal piece 109, separately of the magnetic head device 28. The coil 87 is connected to the battery 17 through a switch 88. The switch 88 is provided adjacent to the lid 23 of the apparatus 10, and is open while the lid 23 is closed and closes when the lid 23 is opened. Hence, if the lid 23 is opened in order to load or unload the cartridge 22 into or from the apparatus 10, the switch 88 closes and the electromagnet 85 is magnetized. Hence, the metal piece 109 is attracted to the electromagnet 85, and the magnetic head 46 is raised upwards along the direction of the arrow Z and away from the magnetic drum 30, to escape out of the cartridge 22. Therefore, the loading and unloading of the cartridge 22 can be carried out without disturbing the magnetic head 46.

Figure 9:
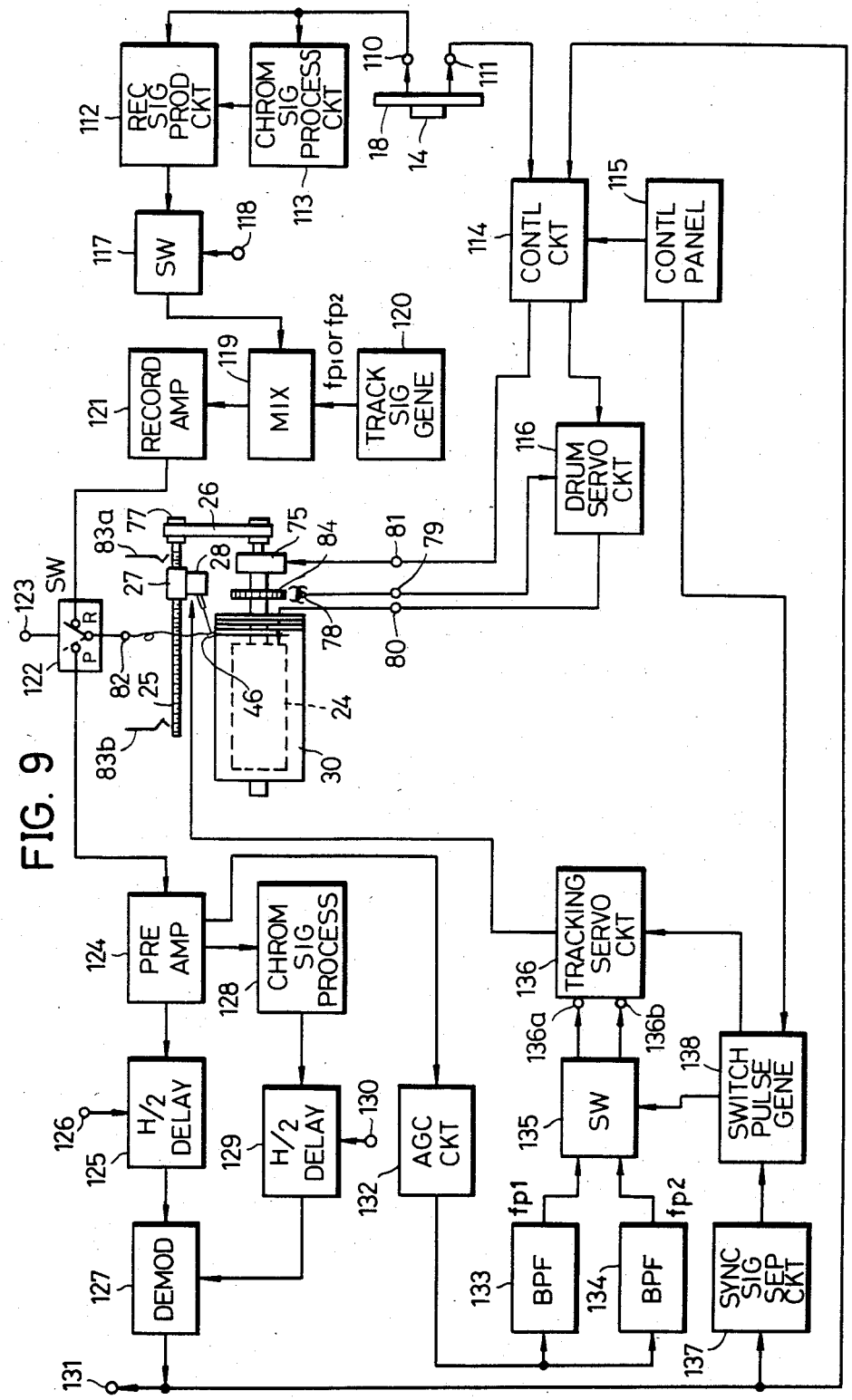
FIG. 9 is a systematic block diagram showing an embodiment of a signal system of the apparatus shown in FIG. 1.

Next, description will be given with respect to an embodiment of an electrical system of the apparatus 10, by referring to a block system shown in FIG. 9. In FIG. 9, those parts which are the same as those corresponding parts in FIG. 7 are designated by the same reference numerals.

Figure 11:
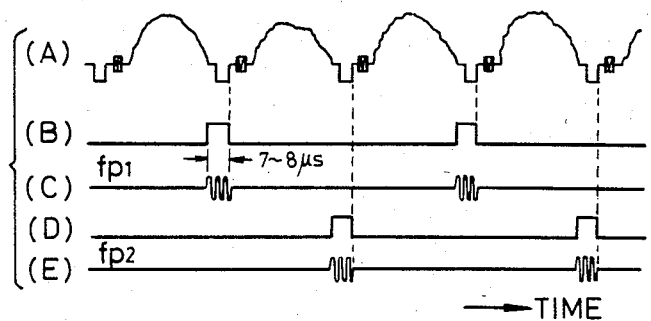
FIGS. 11(A) through 11(E) are graphs, respectively showing signal waveforms at other parts of the block system shown in FIG. 9.

A color video signal shown in FIG. 10(A) or 11(A) which is picked up by the solid-state image pickup element 14 and produced from the circuit including the printed circuit 18, is supplied to a recording signal producing circuit 112 and a chrominance signal processing circuit 113 from an output terminal 110. Similarly, a synchronizing signal generated by the above circuit is supplied to a control circuit 114 through an output terminal 111. A control panel 115 is an operation panel including the operation switch 21 for setting the operation mode. An output of the control panel 115 is supplied to the control circuit 114. The control circuit 114 causes the motor 24 which drives the magnetic drum 30 to undergo synchronous rotation at the rotational speed of 3600 rpm as described before, through a drum servo circuit 116. In addition, the control circuit 114 supplies a control signal in accordance with the operation mode to the electromagnetic clutch 75 which causes a reduced rotational speed of 3.6 rpm of the output shaft 76 by the speed reduction gear mechanism 83, through the terminal 81, to control the operation of the electromagnetic clutch 75.

Figure 12:
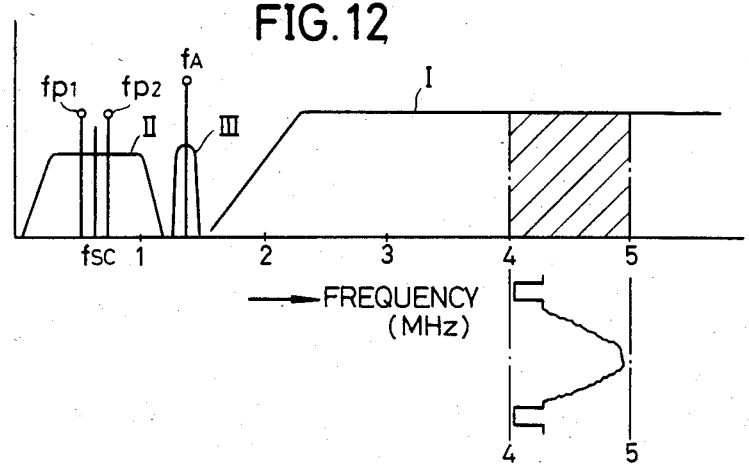
FIG. 12 shows a frequency spectrum of a signal which is recorded.

The carrier chrominance signal within the above color video signal thus picked up, is frequency-converted into a low-band-converted carrier chrominance signal having a subcarrier frequency $f_{sc}$ (629 kHz, for example) at the chrominance signal processing circuit 113. The resulting low-band-converted carrier chrominance signal is then supplied to the recording signal producing circuit 112. The recording signal producing circuit 112 separates the luminance signal within the above color video signal, and frequency-modulates the separated luminance signal. The frequency-modulated luminance signal is subjected to frequency-division multiplexing with the low-band-converted carrier chrominance signal from the chrominance signal processing circuit 113, and produces a recording information signal. The frequency spectrum of this recording information signal is shown in FIG. 12. In FIG. 12, a band I indicates the frequency-modulated luminance signal, and a band II indicates the frequency-converted carrier chrominance signal. It is possible to also record an audio signal. In this case, an audio signal of the sound picked up by a microphone (not shown) of the apparatus 10 shown in FIG. 1 is frequency-modulated (the carrier frequency of the audio signal is $f_A$) to occupy a band III shown in FIG. 12.

The above recording information signal is supplied to a switching circuit 117. The recording information signal is passed through the switching circuit 117 only during even field periods and blocked during odd field periods, for example, that is, the recording information signal is only passed through during either one of the odd and even field periods, by a switching pulse shown in FIG. 10(C) having a 1-field of positive period which is obtained from an input terminal 118. As a result, only the recording information signal of the even field periods is passed from the switching circuit 117 during every other field period (that is, a so-called field-skip is performed), and supplied to a mixer 119. An output of a flip-flop (not shown) triggered by a vertical synchronizing pulse shown in FIG. 10(B) which is separated from the input color video signal, may be used as the above switching pulse.

A tracking signal generator 120 generates first and second tracking control reference signals (hereinafter simply referred to as tracking signals) fp1 and fp2 which exist within the band II of the above low-band-converted carrier chrominance signal as shown in FIG. 12 and have mutually different frequencies. A set of gate pulses respectively shown in FIGS. 10(D) and 10(E), each having a repetition frequency of 30 Hz, which is a half of that of the above switching pulse, of which the positive polarity is a 1-field period in phase synchronism with the negative polarity period of the above switching pulse, and the relative phases of the two gate pulses differ by 2-field period in time, are generated by a circuit within the tracking signal generator 120. As a result, the first tracking signal fp1 is supplied to the mixer 119 during the positive polarity period of the gate pulse shown in FIG. 10(D), and the second tracking signal fp2 is supplied to the mixer 119 during the positive polarity period of the gate pulse shown in FIG. 10(E).

In the present embodiment, in order to prevent beat interference with respect to the recording information signal in the magnetic recording and reproducing transmitting system and carry out the recording and reproduction at a suitable level with a high signal-to-noise (S/N) ratio, the tracking signals fp1 and fp2 are generated in a form of tone burst existing only within intervals corresponding to horizontal blanking periods avoiding the video period and the color burst period of the input color video signal shown in FIG. 11(A) as shown in FIGS. 11(C) and 11(E) by the switching pulses shown in FIGS. 11(B) and 11(D). In addition, as clearly seen from FIGS. 11(A) through 11(E), the first and second tracking signals fp1 and fp2 are generated for every second 1H (H indicates a horizontal scanning period) for a 2H period, for reasons which will be described hereinafter. Furthermore, as will be described hereinafter, two kinds of tracking signals fp1 and fp2 are recorded on adjacent tracks having therebetween one information signal recording track on the recording track pattern, with 1H shift in an alternate manner.

Accordingly, only the first tracking signal fp1 is produced from the mixer 119 in a burst manner during a certain field (for example, odd field) period and a frequency-division multiplexed recorded signal FM (Fe1) of a succeeding field (even field) period is produced during that succeeding field period, as shown in FIG. 10(F). Further, during a succeeding odd field period, only the second tracking signal fp2 is produced in a burst manner, and during a succeeding even field period, a recorded signal FM (Fe2) of that succeeding even field is produced. Thus, a time-sequential multiplexed signal is obtained by similarly repeating the above described production of signals. The time-sequential multiplexed signal is amplified to a suitable level at a recording amplifier 121. The amplified signal from the recording amplifier 121 passes through a switching circuit 122 which is connected to a terminal R by a recording mode signal from a recording mode terminal 123, and is supplied to the magnetic head 46 from the terminal 82. The signal hence supplied to the magnetic head 46 is recorded on the spiral or concentric track formed on the magnetic surface 31 of the magnetic drum 30.

As described above, the first and second tracking signals fp1 and fp2 exist within the band II of the low-band-converted carrier chrominance signal in the frequency spectrum. However, timewise, these tracking signals fp1 and fp2 are time-sequentially transmitted within a period different from the transmission period of the low-band-converted carrier chrominance signal. In addition, because the tracking signals fp1 and fp2 are transmitted within the horizontal blanking period avoiding the color burst signal period as shown in FIGS. 11(A) and 11(E), the recording and reproduction can be carried out with high S/N ratio without beat interference therebetween.

Next, description will be given with respect to the recording pattern on the magnetic drum 30. In the present embodiment, if the track width of the gap of the magnetic head 46 is set to 3.5 μm and the track pitch is set to 2 μm, the time-sequential multiplexed signal shown in FIG. 10(F) is recorded on the magnetic drum 30 with a track pattern shown in FIG. 13. Because the magnetic drum 30 is driven to undergo synchronous rotation at 3600 rpm under servo control, if a position SP is assumed to be the recording position of the vertical synchronizing pulse, the vertical synchronizing pulses and the horizontal synchronizing pulses are recorded in a state aligned along the head feeding direction (the direction of an arrow A).

Each of the tracks t1, t2, t3, t4, ..., t7, ... are formed by the magnetic head 46 for every one revolution of the magnetic drum 30. During the first revolution of the magnetic drum 30, the track t1 is formed. In this track t1, the first tracking signal fp1 is recorded with a 2-field period from a position of the second horizontal blanking period after the vertical synchronizing pulse. The information signal recording track t2 is formed during the next one revolution of the magnetic drum 30. The information signal of the even field period obtained from the above switching circuit 117, is recorded in this track t2. Further, the track t3 is formed during the next one revolution of the magnetic drum 30. In this track t3, the second tracking signal fp2 is recorded with a 2-field period from a position of the first horizontal blanking period after the vertical synchronizing pulse.

Figure 13:
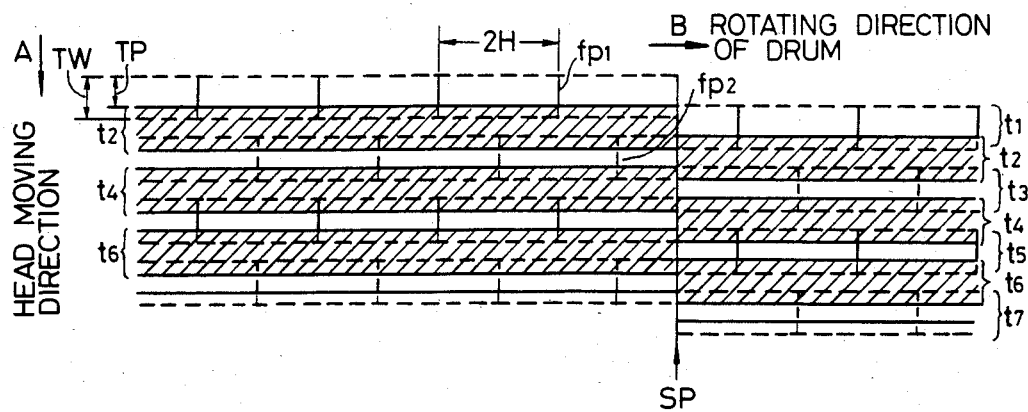
FIG. 13 is a partially enlarged view showing an example of a recording pattern on the recording medium according to the present invention.

In the present embodiment, the track width indicated by TW in FIG. 13 is selected to a value larger than the track pitch indicated by TP, as described above. For this reason, overlap recording is carried out between a certain track and a succeeding track which is recorded and formed following that certain track, by a length corresponding to the difference between the track width and the track pitch (1.5 m in this case). A part of the track which is subjected to the overlap recording of another following track, is demagnetized at the overlapping recording part. Similarly thereafter, the recording position SP of the vertical synchronizing pulse assumes the starting point and the terminal point of the recording for every one revolution of the magnetic drum 30, and the tracking signal fp1 or fp2 and the information signal are alternately recorded. Hence, on tracks formed on both sides of the information signal recording tracks t2, t4, t6, ... indicated by hatching in FIG. 13, the first tracking signal fp1 is recorded at positions indicated by solid lines on one track and the second tracking signal fp2 is recorded at positions indicated by dotted lines on the other track. Accordingly, a track pattern is formed wherein the tracking signals fp1 and fp2 are recorded overlapping over the information signal recording track by a length corresponding to the difference between the track width TW and the track pitch TP. In addition, the recording positions of the first tracking signal fp1 and the second tracking signal fp2 are shifted by 1H as shown in FIG. 13.

The principle of the tracking control performed by use of the first and second tracking signals fp1 and fp2 is similar to that disclosed in a U.S. Pat. No. 4,331,976 although the recording medium is a disc in this patent.

Description will now be given with respect to a reproducing system, by returning to FIG. 9. During the reproduction, the switching circuit 122 is connected to a terminal P by a reproduction mode signal from the terminal 123. The magnetic head 46 reproduces the information signal from recording tracks t2, t4, t6, ... on the magnetic drum 30. Because the track pitch TP is smaller than the track width TW, three kinds of signals, that is, the information signal and the first and second tracking signals fp1 and fp2 from the adjacent tracks on both sides of the intended reproducing track, are reproduced simultaneously. The reproduced signal passes through the switching circuit 122 and is amplified to a suitable level at a preamplifier 124. The amplified signal is supplied to a H/2-delay circuit 125, a chrominance signal processing circuit 128, and an automatic gain control (AGC) circuit 132. The chrominance signal processing circuit 128 separates and filters the low-band-converted carrier chrominance signal from within the reproduced signal, and frequency-converts the low-band-converted carrier chrominance signal back into its original band to obtain a reproduced carrier chrominance signal. This reproduced carrier chrominance signal is supplied to a demodulating circuit 127 through a H/2-delay circuit 129.

The demodulating circuit 127 frequency-demodulates the frequency-modulated luminance signal from within the reproduced signal from the delay circuit 125. The demodulated luminance signal is multiplexed with the reproduced carrier chrominance signal from the delay circuit 129. As a result, a color television signal in accordance with the standard television system is produced. The output signal of the demodulating circuit 127 is fed to an output terminal 131, and is also supplied to a synchronizing signal separating circuit 137 and the control circuit 114. The vertical synchronizing pulse separated at the synchronizing signal separating circuit 137 is supplied to a switching pulse generator 138, and used as a reference when generating the switching pulse.

The delay circuits 125 and 129 repeat operations in which the input signal is delayed by H/2 for a certain field and not delayed for a field succeeding that certain field, according to respective control signals from terminals 126 and 130. Because the video signal which is recorded and reproduced is a video signal of every second fields, that is, a video signal of either one of the odd or even fields, the above delay of H/2 for every second field is necessary to achieve an interlace.

The level deviation in the signal from the preamplifier 124 due to causes other than the track shift, is controlled to become constant at the AGC circuit 132. The output of the AGC circuit 132 is supplied to bandpass filters 133 and 134 wherein the first and second tracking signals fp1 and fp2 within the reproduced signal are respectively separated. Outputs of the above bandpass filters 133 and 134 are supplied to a switching circuit 135. The switching circuit 135 is switched by the switching pulse from the switching pulse generator 138, and alternately supplies the first and second tracking signals fp1 and fp2 to input terminals 136a and 136b of a tracking servo circuit 136. The switching circuit 135 does not perform switching during a slow-motion reproduction mode, and performs the switching only during the normal reproduction for every one revolution of the magnetic drum 30. The tracking servo circuit 136 detects envelopes of the tracking signals fp1 and fp2, and produces a tracking error signal through a differential amplifier. The tracking error signal is converted into a predetermined driving voltage, and supplied to the magnetic head device 28. Accordingly, the magnetic head 46 is displaced along the track width direction of the recording track, and the tracking control is performed so that the tracking signals fp1 and fp2 are constantly reproduced with equal and the same constant reproducing level, that is, so that the level of the FM signal within the reproduced information signal is maintained constantly maximum.

If a still-picture reproduction is to be carried out by repeatedly reproducing the same track, for example, the switching pulse is not generated from the switching pulse generator 138 (or the polarity of the switching pulse is maintained to a constant level), and the tracking polarity is constantly kept to the same polarity. When reproducing the track t4 shown in FIG. 13, for example, a track scanning locus of the magnetic head 46 is shifted towards the track t6 if the level of the first tracking signal fp1 is greater than that of the second tracking signal fp2. On the other hand, a track scanning locus of the magnetic head 46 is shifted towards the track t2 if the level of the first tracking signal fp1 is less than that of the second tracking signal fp2. Hence, the magnetic head 46 is displaced by a fine increment towards the track t2 in the former case and towards the track t6 in the latter case, and the tracking control is performed so that the magnetic head 46 constantly scans over the center line of the track t4.

However, when reproduction of the track t5 is started from the position SP indicated in FIG. 13 which is the terminal position of reproduction of the track t4, the first tracking signal fp1 from the track t5 is reproduced with the maximum level. Thus, the magnetic head 46 is rapidly and instantaneously displaced towards the track t2, because the tracking polarity upon still-picture reproduction is maintained to the tracking polarity upon scanning of the track t4. As a result, the magnetic head 46 is drawn back so as to constantly reproduce the track t4 even at discontinuous track parts where the recording position SP of the vertical synchronizing pulse is shifted, so that the reproducing levels of the tracking signals fp1 and fp2 become balanced. Therefore, in this case, the still reproduction picture in terms of fields, can be performed by repeatedly reproducing only the track t4.

Next, during normal reproduction, the magnetic head device 28 is fed continuously along the axial direction of the magnetic drum 30 at a predetermined speed similar to that upon recording. Each track on the magnetic drum 30 must be scanned and reproduced twice, because the so-called field-skip recording is carried out and the signal is recorded on the magnetic drum 30 for only every second fields as described above. In this case, after the magnetic head 46 scans over the track t2 shown in FIG. 13 twice, for example, the magnetic head 46 must be rapidly moved to a position immediately after the position SP of the track t4 from a position of the track t2 immediately preceding the recording position SP of the vertical synchronizing signal. In this case, the polarity of the output switching pulse of the switching pulse generator 138 is reversed so as to reverse the tracking polarity from the position SP. Accordingly, conversely as upon scanning of the track t2, the magnetic head 46 is displaced along the track width direction, towards the track t2 if the detected envelope of the tracking signal fp1 is larger than that of the tracking signal fp2, and towards the track t6 if the detected envelope of the tracking signal fp1 is smaller than that of the tracking signal fp2. That is, tracking control is performed so that the magnetic head 46 scans and reproduces the track t4.

Thereafter, a symmetrical square wave in phase synchronism with the vertical synchronizing pulse and having a 4-field period, is similarly generated by the switching pulse generator 138 and supplied to the switching circuit 135. Accordingly, the magnetic head 46 repeatedly reproduces each of the information signal recording tracks twice, to obtain the normal reproduction picture.

Figure 14:
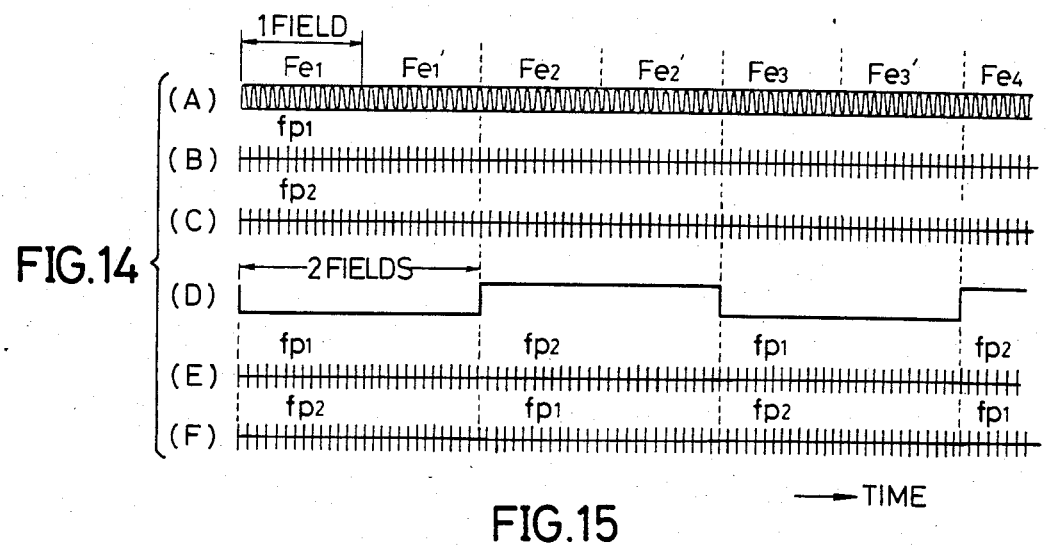
FIGS. 14(A) through 14(F) are graphs showing signals for explaining the operation of a reproducing system within the block system shown in FIG. 9.

FIG. 14(A) shows an input reproduced signal waveform to the preamplifier 124 during the above normal reproduction. Signal waveform in fields Fe1', Fe2', and Fe3' respectively indicate signal waveforms obtained when the signals in the fields Fe1, Fe2, and Fe3 are reproduced for the second time. Moreover, during this normal reproduction, the tracking signal fp1 shown in FIG. 14(B) is obtained from the reproduced signal at the bandpass filter 133, and the tracking signal fp2 shown in FIG. 14(C) is obtained from the reproduced signal at the bandpass filter 134. FIG. 14(D) shows the output switching pulse of the switching pulse generator 138 during the normal reproduction. Furthermore, FIGS. 14(E) and 14(F) respectively show input tracking signals to the input terminals 136a and 136b of the tracking servo circuit 136.

In the above embodiment, the video signal and the tracking signals are alternately recorded on each track on the magnetic drum 30 by the magnetic head 46. Hence, the so-called field-skip of every other field (only the even fields are recorded, for example) is carried out upon recording with respect to the video signal. For this reason, if a microphone is provided in the apparatus 10 and an attempt is made to record the audio signal picked up by the microphone together with the video signal by inserting the audio signal into the band III in FIG. 12, the audio information will be missing for the every other field by the above field-skip recording.

Accordingly, in order to continuously record all fields of the video signal and continuously record the audio signal without missing the audio signal, two magnetic head devices 28 are provided separated from each other. The feeding range is limited so that one magnetic head device carries out recording and/or reproduction of an upper half of the magnetic drum 30, and the other magnetic head device carries out recording and/or reproduction of a lower half of the magnetic drum 30. Further, measures are taken so that one magnetic head records or reproduces the tracking signals while the other magnetic head records or reproduces the information signal comprising the video signal of the odd fields, for example, and the audio signal, and the above one magnetic head records or reproduces the information signal comprising the video signal of the even fields and the audio signal while the above other magnetic head records or reproduces the tracking signals. These operations are repeated thereafter. As a result, the video signal and the audio signal can be recorded and/or reproduced continuously, by alternately recording and/or reproducing the information signal and the tracking signals by the two magnetic heads.

In the above described embodiment, electronic tracking control is performed with respect to the magnetic head 46 by use of the tracking signals fp1 and fp2. However, the track width and the guard band between the tracks may be made larger than in the above embodiment, to omit the electronic tracking control circuit. In this case, the construction of the apparatus 10 is simplified and the cost of the apparatus is reduced, although the recording capacity is reduced.

The window 37 on the case 36 of the cartridge 22 can be made to close in the state where the cartridge 22 is not loaded into the drive assembly 40 of the apparatus 10, and open when the cartridge 22 is loaded into the apparatus 10.

In addition, in the above embodiment, the case 36 is in a state loaded within the drive assembly 40 together with the magnetic drum 30, even in the state where the cartridge 22 is loaded within the drive assembly 40. However, the construction is not limited to this construction. That is, the construction may be such that the magnetic drum is accommodated within the case in the state where the cartridge is not loaded into the drive assembly, and the case is disengaged from the magnetic drum after the cartridge is loaded into the drive assembly so that only the case is withdrawn leaving the magnetic drum within the drive assembly. In this case, when the magnetic drum is to be retrieved from the apparatus 10, the case is inserted within the drive assembly to connect the case with the magnetic drum. Thereafter, the case and the magnetic drum is unitarily retrieved as the cartridge.

Further, it is not essential to provide the mechanism for swinging the head upon loading and unloading of the cartridge 22. In relation with the cartridge loading mechanism, the magnetic head may be kept stationary (but mounted by way of a suitable resilient member) during the loading and unloading of the cartridge 22, and the cartridge may be loaded and unloaded in an inclined state to avoid disturbing the magnetic head.

In order to form the magnetic surface 31 of the above magnetic drum 30 into a perfect cylindrical-shape, the outer peripheral surface of the main body of the magnetic drum 30 is machined to a perfect cylindrical-shape, and the surface is subjected to precision lapping. The magnetic surface 31 is formed by applying the magnetic layer onto the surface thus formed by lapping, as described above.

Figure 15:
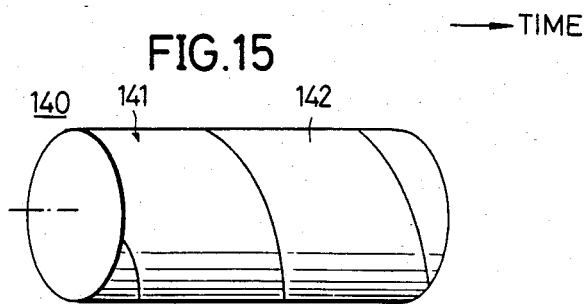
FIG. 15 is a perspective view showing a second embodiment of a recording medium according to the present invention.

Instead of forming the above magnetic surface 31 by the formation of the magnetic layer, a magnetic surface 141 can be formed on a magnetic drum 140 as shown in FIG. 15. This magnetic surface 141 is formed by wrapping a wide magnetic tape 142 around the main body of the magnetic drum in a spiral manner. In addition, although illustration thereof is omitted, a flexible plastic film (polyethylene terephthalate film, for example) applied with the magnetic layer may be be formed into a cylindrical-shape, to obtain the magnetic drum by adhering both ends of the plastic film.

The magnetic drum with such a machined and lapped body has an advantage of having a perfectly straight cylinder so that the scanning speed of the magnetic head with respect to the magnetic drum can be ideally constant as the diameter of the drum is constant throughout the full recording and/or reproducing range. However, because of the complex manufacturing process of machining and lapping, the manufacturing cost for such magnetic drums would be very expensive. This suggests that such machined and lapped body magnetic drum would only be suitable for industrial and institutional applications where high performance characteristics are demanded, and not for consumer use.

And, in this regard, manufacturing such perfectly straight drums by plastic molding for cost saving purpose, is not practical because the molded piece will not be removed from the mold even if attempted.

The magnetic drum using the magnetic tape or the magnetic film can be manufactured at low cost, and it is possible to mass produce such a magnetic drum. However, there is a problem in that dropout is introduced in the recording and reproducing signal when the magnetic head scans over the boundary of the magnetic tape or the magnetic film which are adhered together.

Thus, description will be given with respect to another embodiment of a recording medium according to the present invention, in which the above problem has been overcome.

Figure 16:
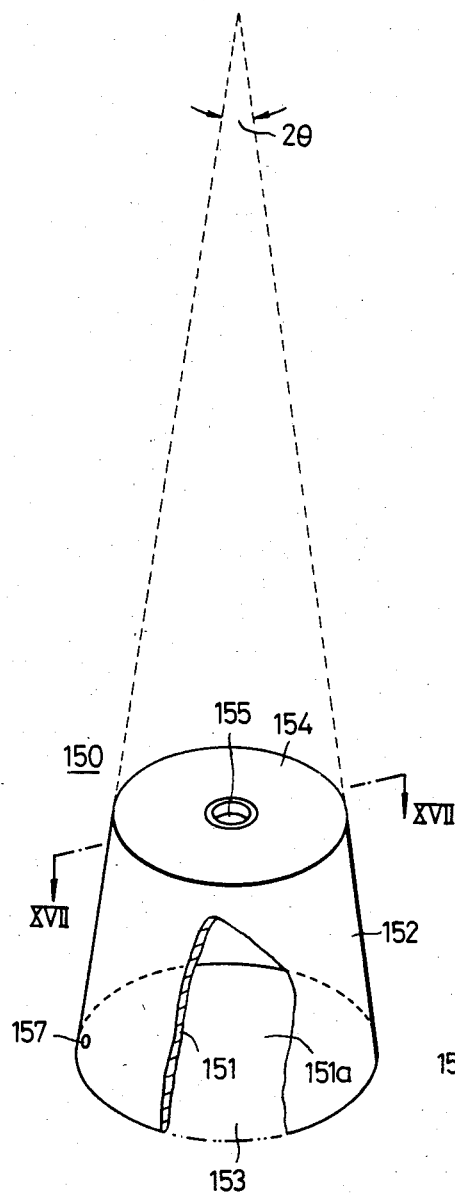
FIG. 16 is a perspective view, with a part cut away, showing a third embodiment of a recording medium according to the present invention.
Figure 17:
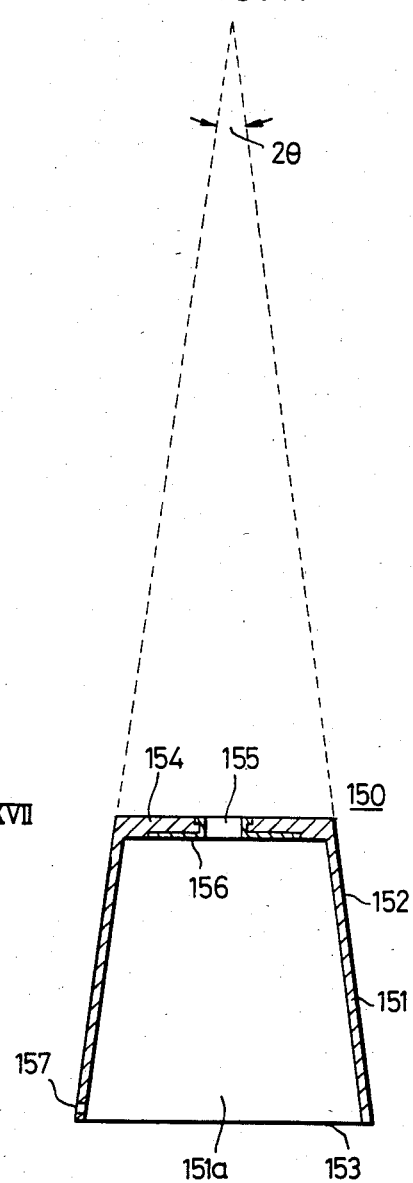
FIG. 17 is an elevation in vertical cross section along a line XVII—XVII in FIG. 16.

A third embodiment of a recording medium according to the present invention is shown in FIGS. 16 and 17. A magnetic drum 150 comprises a main drum body 151 molded from plastic having its outer peripheral surface made to a mirror-like finish, and a magnetic layer 152 applied and formed on the outer peripheral surface of the main drum body 151. The main drum body 151 has an outer form of a right circular truncated conical-shape obtained by cutting a right circular cone along a plane parallel to the bottom surface thereof. The main drum body 151 is a hollow thin plastic molded piece, comprising a hollow part 151a. An opening 153 is provided at the lower end of the main drum body 151, and a hole 155 is provided at the center of an upper end surface part 154. A connecting part 156 made of a ferromagnetic material such as soft iron, for example, is embeddedly provided at the upper end surface part 154 in a state exposed to the lower surface of the upper end surface part 154. A hole 157 used as a mark part is formed at the lower end of the main drum body 151. This mark part may be provided at a position in the vicinity of the upper end of the main drum body 151.

If the imaginary vertex angle of the right circular conical-shaped main drum body 151 is assumed to be $2\theta$, this angle $2\theta$ is actually in the range of 1° to 4° although the angle $2\theta$ is shown magnified in the figures as if this angle is a larger angle. The main drum body 151 assumes the right circular conical-shaped in order to facilitate the molded main drum body removing from the mold when this main drum body 151 is molded from plastic, as will be described hereinafter.

Figure 18:
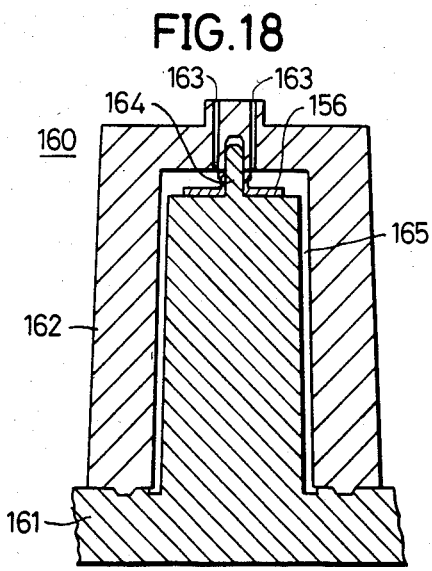
FIG. 18 is a view in vertical cross section showing an example of a molding apparatus for molding the recording medium shown in FIGS. 16 and 17.

A molding apparatus 160 shown in FIG. 18 is used, for example, when molding the main drum body from plastic. The molding apparatus 160 comprises a convex mold die 161 and a concave mold die 162 having an injecting hole 163. The outer peripheral surface of the die 161 and the inner peripheral surface of the die 162 respectively have the shape of a right circular cone having an imaginary vertex angle $2\theta$. First, in a state where the die 162 is separated from the die 161, a center hole of the connecting member 156 is fit over a central projection 164 of the die 161. Next, the die 162 and the die 161 are assembled in a state shown in FIG. 18. Melted synthetic resin is injected into a gap 165 between the dies 161 and 162 through the injecting hole 163, in the state shown in FIG. 18. Thereafter, the dies 161 and 162 are cooled before these dies 161 and 162 are separated. As a result, the main drum body 151 molded from plastic, in which the connecting member 156 is embeddedly fixed thereto, is obtained. When removing the molded main drum body 151 from the dies 161 and 162, the molded main drum body 151 can be removed with ease because the taper of the vertex angle $2\theta$ is provided.

If the above vertex angle $2\theta$ is large, the diameter of the magnetic surface will differ as the magnetic head travels. As a result, the relative linear speed between the magnetic drum and the magnetic head will vary. Accordingly, it is desirable for the vertex angle $2\theta$ to assume a small angle, and the vertex angle $2\theta$ is selected to a minimum value within a range in which the plastic molding is possible.

In order to apply and form the magnetic layer on the outer peripheral surface of the main drum body 151 without subjecting the surface of the main drum body 151 to lapping process, the outer peripheral surface of the molded main drum body 151 must already be of a mirror-like finish. For this reason, the inner peripheral surface of the die 162 must be of a mirror-like finish. For example, an amorphous material (silica glass, for example) having a mirror-like finish such that the surface roughness is in the range of 0.01 μm, for example, by subjecting the amorphous material to optical polishing process, is used for the inner peripheral surface of the die 162.

A resin such as a polycarbonate, acrylonitrile, butadiene, styrene copolymer resin (ABS), and acrylic resin which are superior in terms of heat-resistance, shock resistance, stiffness, and surface hardness, or a resin which is suited for molding process, is used for the synthetic resin material for the above molding.

The surface roughness of the outer peripheral surface of the molded main drum body 151 is in the range of 0.01 μm, and the magnetic layer is applied and formed on the outer peripheral surface by deposition, sputtering, electroless plating, and the like. The magnetic drum 150 is completed by providing the hole 157 which acts as the mark part, at a predetermined position in the main drum body 151. As an embodiment of a method of applying and forming the magnetic layer, there is a method in which a thin layer of cobalt, nickel, or phosphor alloy, for example, of a thickness in the range of approximately 0.1 μm to 0.2 μm is applied to the outer peripheral surface of the main drum body 151 by eletroless plating, and a protective layer of $SiO_2$ having a thickness of 0.01 μm is applied thereon.

In an embodiment of practical dimensions of the main drum body 151, the diameter of the upper end surface part 154 is 25 mm, the diameter of the lower end part is 27 mm, the length of the generatrix is 54 mm, the vertex angle $2\theta$ is 2°, and the thickness of the peripheral side wall is 1.5 mm. In this example of the dimensions of the main drum body 151, the circumferential difference between the lower end part and the upper end surface part of the main drum body is approximately 7%. Accordingly, there approximately is a 7% difference in the relative linear speed between the magnetic head and the magnetic surface 152, at the lower end part and the upper end surface part of the main drum body. However, even if there is a difference in the relative linear speed to this extent, no problems are introduced in the actual magnetic recording and reproducing characteristics from the practical point of view.

Figure 19:
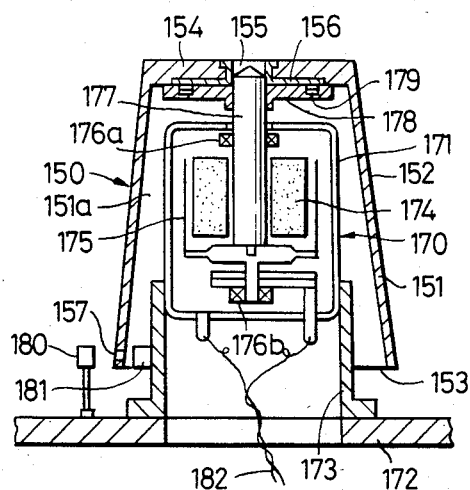
FIG. 19 is a view in vertical cross section showing a state where the recording medium shown in FIGS. 16 and 17 is loaded into a drive assembly.

A state where the magnetic drum 150 is loaded into a drive assembly 170, is shown in FIG. 19. In the drive assembly 170, a motor 171 is a coreless motor and is supported on a support 173 which is provided on a base 173. The motor 171 is constructed so that a coil 175 rotates with respect to a fixed magnet 174. A rotary shaft 177 is supported by bearings 176a and 176b, and rotates together with the coil 175. A rotary plate 178 is fixed to the upper end part of the rotary shaft 177. Further, a ring-shaped permanent magnet 179 is provided on the upper surface of the rotary plate 178.

The magnetic drum 150 is loaded into the drive assembly 170 from above, so that the motor 171 relatively enters within the hollow part 151a of the magnetic drum 150. In addition, the upper end part of the rotary shaft 177 is fitted into the hole 155. When the upper end surface part 154 of the magnetic drum 150 is placed onto the rotary plate 178, the connecting member 156 embeddedly provided in the upper end surface part 154 is attracted by the permanent magnet 179 of the rotary plate 178, and the connecting member 156 and the permanent magnet 179 connect unitarily. Hence, when the motor 171 is rotated by supplying a voltage through a lead wire 182, the magnetic drum 150 is rotated unitarily with the rotary plate 178.

A light-emitting element 180 and a photosensitive element 181 are respectively provided on the base 172 and the support 173, at height positions opposing the mark part 157 of the magnetic drum 150. As the magnetic drum 150 rotates, the photosensitive element 181 receives the light from the light-emitting element 180 every time the mark part 157 passes between the photosensitive element 181 and the light-emitting element 180, and produces a signal indicating the rotational phase of the magnetic drum 150. The recording and/or reproducing apparatus can constantly carry out the recording and/or reproduction with a constant phase relationship by using the above rotational phase signal, regardless of the phase relationship of the magnetic drum 150 with respect to the magnetic head, with which the magnetic drum 150 is loaded into the drive assembly 170. Accordingly, it is possible to carry out the recording and/or reproduction so that the vertical synchronizing signal positions for each field are aligned on the generatrix of the magnetic drum 150.

Figure 20:
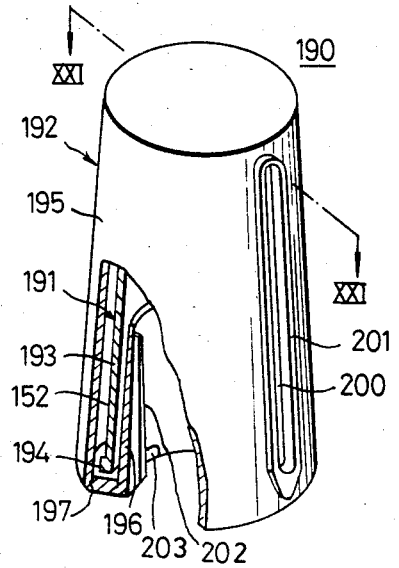
FIG. 20 is a perspective view, with a part cut away, showing a second embodiment of a cartridge accommodating a magnetic drum within a case.
Figure 21:
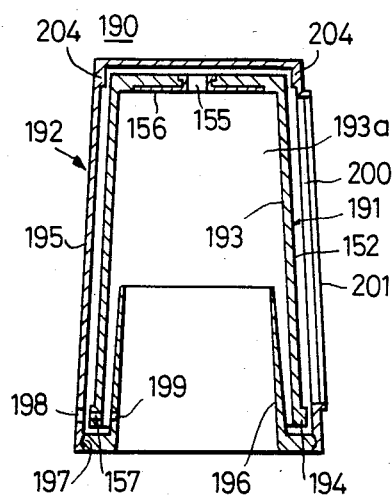
FIG. 21 is a view in vertical cross section along a line XXI—XXI in FIG. 20.

A second embodiment of a magnetic drum cartridge in which a magnetic drum is accommodated within a case, is shown in FIGS. 20 and 21. A magnetic drum cartridge 190 comprises a magnetic drum 191 and a case 192. The magnetic drum 191 comprises a main drum body 193 and a magnetic layer 152 which is applied and formed on the outer peripheral surface of the main drum body 193. Similarly as in the case of the magnetic drum 150, the hole 155 is provided on the upper end surface part of the main drum body 193, and the connecting member 156 is also embeddedly formed in the upper end surface part. A plurality of or a ring-shaped projection 194 is unitarily formed on the outer peripheral edge part at the lower end of the main drum body 193.

The case 192 comprises an external wall part 195 of a hollow cylindrical-shape which is open at the lower end thereof, and an inner wall part 196 which engages with the lower end part of the external wall part 195 being coaxially assembled inside a hollow part 193a of the main drum body 193. A lower half of the magnetic drum 191 resides within a gap between the outer and inner wall parts 195 and 196, separated from these outer and inner wall parts 195 and 196. Upon assembly, the upper end surface part of the magnetic drum 191 is inserted into the outer wall part 195 of the case 192 up to the tip end thereof, and the inner wall part 196 is inserted into the hollow part 193a thereafter, to engage the inner wall part 196 to the outer wall part 195 at an engaging part 197. A plurality of or a ring-shaped projection 204 is formed on the inner peripheral surface of the outer wall part 195 of the case 192. The magnetic drum 191 is restricted of its movement in the horizontal direction within the outer wall part 195 by the projections 194 and 204, and the magnetic layer is prevented from being damaged due to contact between the inner peripheral surface of the outer wall part 195. The outer and inner wall parts 195 and 196 are molded from plastic, for example. Light transmitting holes 198 and 199 are respectively provided at the lower end parts of the outer and inner wall parts 195 and 196, at positions opposing the hole 157 provided at the lower end part of the magnetic drum 190 as a mark part.

A window 200 for permitting the magnetic head to make contact with the magnetic layer of the magnetic drum 191, is provided on the outer wall part 195 of the case along the generatrix direction thereof. A guide projection 201 is formed at the outer peripheral part of the window 200. The guiding projection 201 fits into a groove (not shown) provided on the drive assembly when the cartridge 190 is loaded into the drive assembly of the recording and/or reproducing apparatus, to restrict the facing direction of the case to a predetermined direction. Accordingly, the window 200 of the case 192 always opposes the magnetic head in the loaded state. A guiding projection 202 comprising a hole 203, is provide at a predetermined position on the inner peripheral surface of the inner wall part 196.

Figure 22:
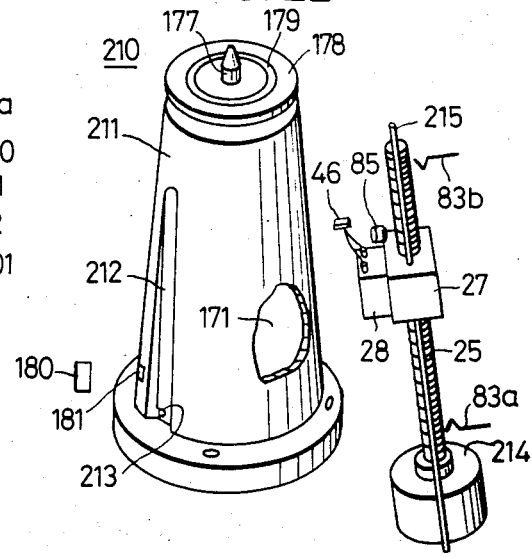
FIG. 22 is a perspective view, with a part cut away, showing a drive assembly which is loaded with the cartridge shown in FIGS. 20 and 21.

A drive assembly loaded with the above magnetic drum cartridge 190, is shown in FIG. 22. In FIG. 22, those parts which are the same as those corresponding parts in FIGS. 7 and 19 are designated by the same reference numerals, and their description will be omitted.

A cartridge holder 211 which externally covers a motor similar to the motor 171 shown in FIG. 19, is fixed to a base. The cartridge 190 is loaded into a drive assembly 210, so that the holder 211 relatively enters within the cartridge 190 from the lower end opening of the cartridge 190. In this state, the guide projection 201 engages with the groove in the drive assembly, and further, guiding projection 202 engages with and is guided by a guiding groove 212 of the holder 211, to restrict the loading direction of the case 192. When the cartridge 190 is loaded unto a final position, a projection provided at the guide groove 212 engages with the hole 203 in the guiding projection 202 of the inner wall part 196, and the cartridge 190 is accordingly positioned. A ball applied with an urging force of a spring, for example, may be used instead of the above projection 213.

The feed screw 25 is rotated by a motor 214 which is a motor independently provided in addition to the motor 171 for driving the magnetic drum. The feed nut 27 is guiding by a guide bar 215 so as not to rotate, and moves linearly as the feed screw 25 rotates. The feed screw 25 and the guide bar 215 are provided obliquely with respect to the rotary shaft 177 of the motor 171 so as to form an angle $\theta$ with the rotary shaft 177, so that the feed screw 25 and the guide bar 215 become parallel to the magnetic surface of the magnetic drum.

Figure 23:
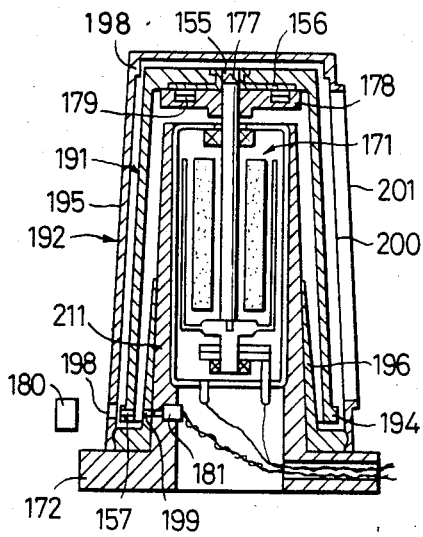
FIG. 23 is a view in vertical cross section showing a state where the cartridge shown in FIGS. 20 and 21 is loaded into the drive assembly shown in FIG. 22.

FIG. 23 shows a view in vertical cross section of a state where the cartridge 190 shown in FIGS. 20 and 21 is loaded into the drive assembly 210 shown in FIG. 22. By the guidance and positioning provided by the above guiding projection 201 and the groove, and the guiding projection 202 and the guiding groove 212, the window 200 assumes a position opposing the magnetic head 46. In addition, the holes 198 and 199 in the outer and inner wall parts 195 and 196 of the cartridge 190, are respectively positioned opposing the respective light-emitting element 180 and the photosensitive element 181.

Figure 24:
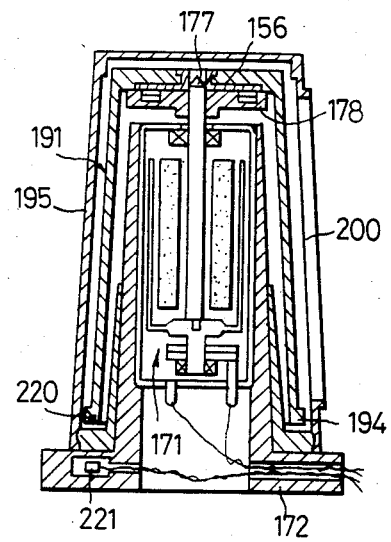
FIG. 24 is a view in vertical cross section showing a magnetic drum cartridge provided with another modification of a rotational phase detecting means and the loaded state of the drive assembly.

The rotational phase detecting means is not limited to the combination of the hole 157, the light-emitting element 180, and the photosensitive element 181. For example, as shown in FIG. 24, a permanent magnet piece 220 may be embeddedly provided at the position of the hole 157 acting as the mark part, and a pickup head 221 may be provided at a position opposing the permanent magnet piece 220. Further, rotational phase detecting means which detects the rotational phase according to variation in electrostatic capacitance may be used.

Figure 25:
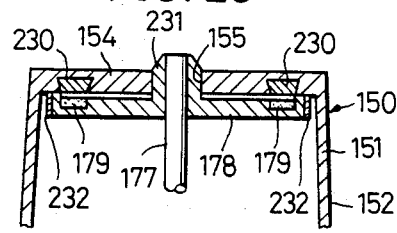
FIG. 25 is a partial view in vertical cross section showing another embodiment of a connection between a rotary plate fixed to a rotary shaft of a motor and an upper end surface part of a magnetic drum.

Another embodiment of the connection between the rotary plate fixed to the rotary shaft of the motor and the upper end surface part of the magnetic drum, is shown in FIG. 25. In this embodiment, a ring-shaped connecting plate 230 made of soft iron, is embeddedly provided in the lower surface of the upper end surface part 154 of the magnetic drum 150. A projection 231 which fits into the hole 155 in the magnetic drum 150, is unitarily provided at the center of the rotary plate 178. A ring 232 made of a ferromagnetic material is provided on the outer peripheral surface of the rotary plate 178, for shielding the leakage magnetic flux from the permanent magnet 179. A depression is formed in the upper surface of the rotary plate 178, excluding the outer peripheral edge part and the center projection 231, so that the magnetic drum 150 is supported by the outer peripheral edge part of the rotary plate 178.

Figure 26:
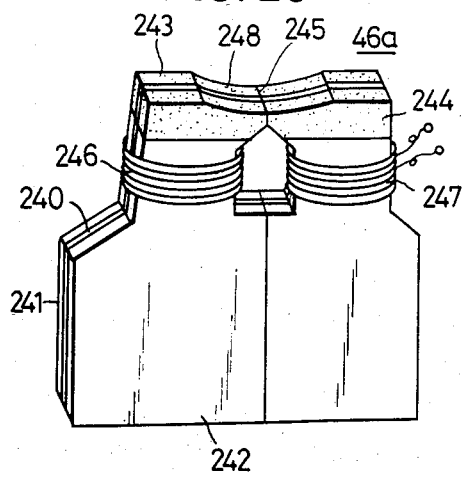
FIG. 26 is a perspective view showing an embodiment of a magnetic head.
Figure 27:
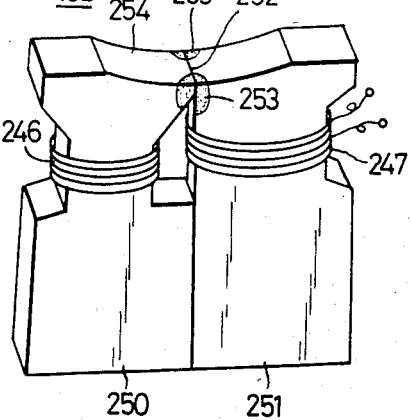
FIG. 27 is a perspective view showing another embodiment of a magnetic head.

Embodiments of the magnetic head 46, are shown in FIGS. 26 and 27. In a magnetic head 46a shown in FIG. 26, a thin layer 240 made of an alloy is sandwiched between polycrystal ferrite plates 241 and 242, to constitute a magnetic path. The tip end part of the thin alloy layer 240 is sandwiched between ceramic plates 243 and 244 having a high resistivity against frictional wear, and a gap 245 is formed at the center of the thin alloy layer 240 and the ceramic plates 243 and 244. Coils 246 and 247 are wound around parts in the vicinity of the tip end parts of the respective ferrite plates 241 and 242. The curvature of a curved concave surface 248 including the gap 245, is slightly smaller than the minimum curvature of the magnetic drum (the maximum diameter part).

A magnetic head 46b shown in FIG. 27 comprises a pair of head cores 250 and 251 made of single crystal ferrite. Glass bondings 253 are adhered in the vicinity of a gap 252. A curved concave surface 254 including the gap 252, is formed at the tip ends of the head cores 250 and 251.

Next, description will be given with respect to embodiments of a case which accommodates a magnetic drum and constitutes a cartridge, by referring to FIGS. 28 through 31.

Figure 28:
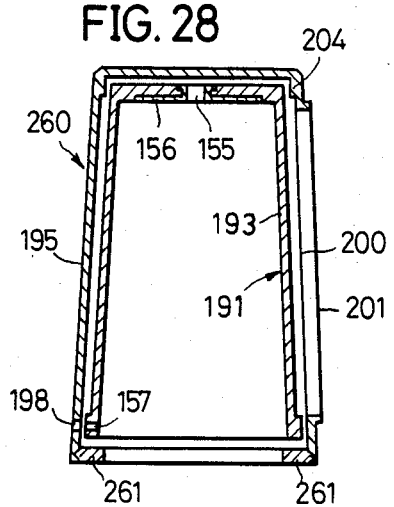
FIG. 28 is a view in vertical cross section showing another embodiment of a cartridge case.

A case 260 shown in FIG. 28 comprises the outer wall part 195 having a similar shape as that shown in FIGS. 20 and 21, and a ring member 261 engaging with the open end of the outer wall part 195. The ring member 261 prevents the magnetic drum 191 from slipping out of the case 260, and also acts as a guide upon loading into the drive assembly.

Figure 29A:
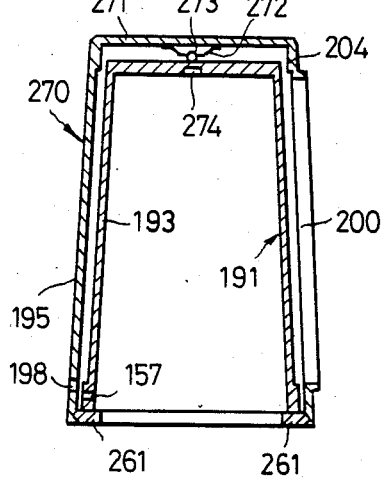
FIGS. 29A and 29B are views in vertical cross section respectively showing still another embodiment of a cartridge case in an unoperated state and an operated state.
Figure 29B:
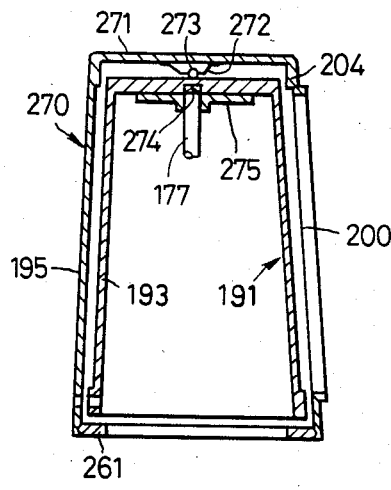

A case 270 shown in FIG. 29A comprises a leaf spring 272 at the center of the ceiling surface of an upper plate part 271. The leaf spring 272 pushes a ball 273 against the center top of the magnetic drum 191. In a non-operated state of the cartridge, the magnetic drum 191 is pushed by the leaf spring 272, and the lower end edge part of the magnetic drum 191 makes contact with the ring member 261. Accordingly, undesirable rotation and play is prevented during the non-operated state of the magnetic drum 191. Next, when the cartridge is loaded into the drive assembly, the upper end part of the rotary shaft 177 of the motor engages with a depression provided at the center on the lower surface of the upper end surface part of the magnetic drum 191, as shown in FIG. 29B. In addition, a rotary plate 275 fixed to the upper part of the rotary shaft 177 makes contact with the ceiling surface of the upper end surface part of the magnetic drum, to lift the magnetic drum. Hence, the lower edge part of the magnetic drum 191 separates from the ring member 261, and assumes a state rotatable together with the rotary plate 275.

Figure 30:
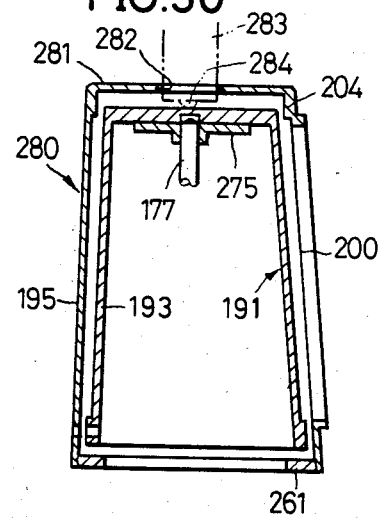
FIG. 30 is a view in vertical cross section showing a further embodiment of a cartridge case.

A hole 282 is provided at the center of an upper plate part 281, in a case 280 shown in FIG. 30. When this cartridge is loaded into the drive assembly, the magnetic drum 191 is lifted by the rotary plate 275, and also pushed downwards by a pushing member 283 comprising a ball 284. As a result, the ceiling surface of the upper end surface part of the magnetic drum 191 makes pressing contact with the rotary plate 275, to ensure fine transmission of the rotation.

Figure 31:
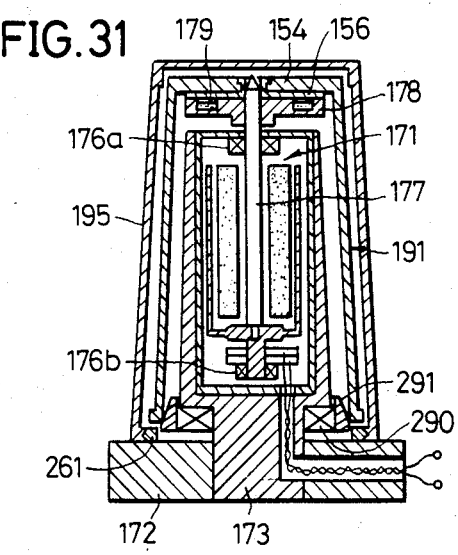
FIG. 31 is a view in vertical cross section showing another embodiment of a drive assembly in a state where a cartridge is loaded therein.

Still another embodiment of a drive assembly is shown in FIG. 31. In each of the above embodiments, the magnetic drum is coupled to the upper part of the rotary shaft of the motor, by means such as the screw 44 and the nut 60, the magnet 179 of the rotary plate 178 and the connecting part 156, and the like. For this reason, if there is fluctuation in the axis of the rotary shaft, the fluctuation at the lower end of the magnetic drum becomes amplified compared to the fluctuation at the upper part of the magnetic drum. The present embodiment has eliminated this problem.

A bearing 290 is provided at the outer periphery of the motor support 173. A ring-shaped receiving member 291 is provided at the outerlace of the bearing 290. When the magnetic drum 191 is loaded into the drive assembly, the connecting part 156 is attracted by the permanent magnet 179 of the rotary plate 178, and the upper end surface part 154 of the magnetic drum is placed onto the rotary plate 178, the inner peripheral surface at the lower end part of the magnetic drum 191 closely fits over the the outer periphery of the receiving member 291. Hence, the magnetic drum 191 is supported at two positions, that is, at the upper and lower end parts thereof.

When the motor 171 is operated and the rotary shaft 177 rotates, the magnetic drum 191 is rotated by the rotary plate 178. In this state, the receiving member 291 which is axially supported by the bearing 290 due to the friction between the magnetic drum 191, is also rotated. Because the magnetic drum 191 is also received by the receiving member 291 in this state, fluctuation in the axis is hardly introduced even at the lower end part of thereof upon rotation.

The receiving member 291 may be embeddedly provided in the bearing 290. Moreover, the outerlace of the bearing 290 itself may be used as the receiving member 291.

Figure 32:
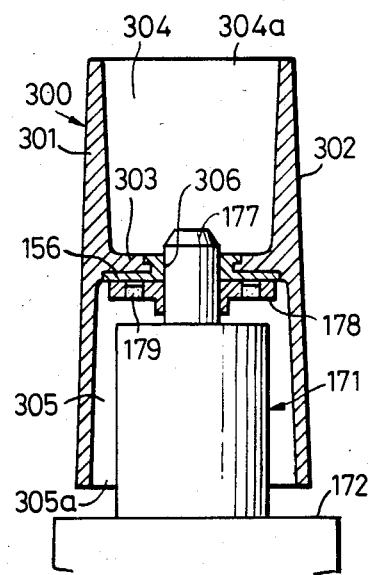
FIG. 32 is a view in vertical cross section showing a fourth embodiment of a recording medium according to the present invention.
Figure 33:
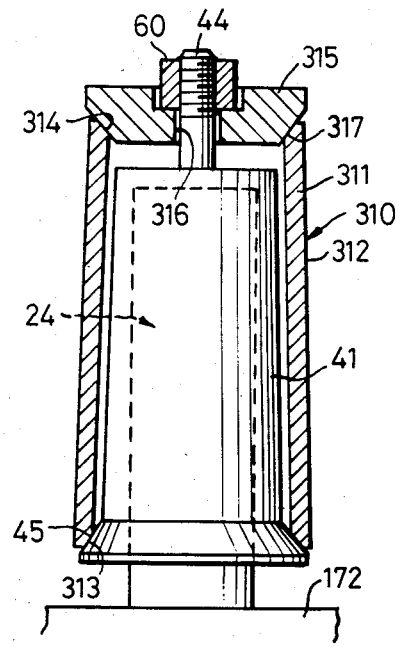
FIG. 33 is a view in vertical cross section showing a fifth embodiment of a recording medium according to the present invention.

Further embodiments of the magnetic drum is shown in FIGS. 32 and 33. In the above described embodiments, the hollow main magnetic drum body comprises the hollow part which has one end open and the other end closed by the upper end surface part. However, in the embodiments described hereinafter, both the upper and lower ends of the hollow main magnetic drum body are open.

In the embodiment shown in FIG. 32, a magnetic drum 300 comprises a hollow and substantially cylindrical-shaped main body 301, and a magnetic surface 302 applied and formed on the cylindrical peripheral surface of the main body 301. The main body 301 comprises a partitioning wall part 303 at a center part thereof. The hollow part within the main body 301 is partitioned into hollow parts 304 and 305 respectively having openings 304a and 305a, by the partitioning wall part 303.

The connecting member 156 is embeddedly provided at the lower surface of the wall part 303. When the magnetic drum 300 is loaded into a drive assembly comprising the motor 171, the motor 171 relatively enters within the hollow part 305 from the opening 305a. The rotary shaft 177 fits into a center hole 306 in the wall part 303, and the magnet 179 attracts the connecting member 156. Thus, the wall part 303 rests on the rotary plate 178. In this state, a part of the motor 171 may be exposed outside the magnetic drum 300.

According to the present embodiment, the magnetic drum 300 is driven in rotation in a state where the center part thereof along the longitudinal direction is supported. Thus, the fluctuation in the axis at the upper and lower ends of the magnetic drum 300 due to fluctuations in the axes of the rotary shaft 177 and the rotary plate 178, becomes one-half the fluctuation in the axis at the lower end part of a magnetic drum of a type which is rotationally driven at the upper end surface thereof as shown in FIGS. 19, 23, and 24, for example.

In the embodiment shown in FIG. 33, a magnetic drum 301 comprises a hollow substantially cylindrical-shaped main body 311 open on both the upper and lower ends thereof, and a magnetic surface 312 applied and formed on the cylindrical peripheral surface of the main body 311. The main body 311 comprises tapered parts 313 and 314 at upper and lower ends on the inner peripheral surface thereof. When the magnetic drum 310 is loaded into a drive assembly comprising the motor 24, the lower end tapered part 313 rests on the tapered part 45 of the drum holder 41. Then, a holding plate 315 is placed onto the magnetic drum 310 in a state where the set screw 44 of the drum holder 41 is inserted through a hole 316 of the holding plate 315. In this state, a tapered part 317 of the holding part 315 fits along the upper end tapered part 314 of the magnetic drum 310. Next, the nut 60 is firmly screwed onto the set screw 44. As a result, the magnetic drum 310 becomes supported at two positions, that is, at the upper position at the tapered part 45 of the drum holder 41 and the lower position at the tapered part 317 of the holding plate 315, and the magnetic drum 310 is accordingly driven by the motor 24 and rotated unitarily with the drum holder 41.

The information signal which is recorded onto and reproduced from the magnetic drum is not limited to the video signal, and may be a pulse code modulated (PCM) audio signal. In addition, the recording medium according to the present invention may also be used as a terminal memory of a computer in place of the existing floppy disc.

Further, the present invention is not limited to these embodiments, but various variations and modifications may be made without departing from the scope of the present invention.

What is claimed is:

1. A recording medium which is user-replaceable for a recording and/or reproducing apparatus which comprises a rotational motor and recording and/or reproducing means, said motor including a rotary shaft, said recording medium being accommodated within an accommodating case which constitutes a cartridge together with said recording medium, said recording medium comprising:

a main body having opposite ends and including a hollow tapered part having a central axis, said tapered part being open at one of said ends of said main body, said main body having a diameter at said one open end which is greater than the diameter of said main body at the other end, said tapered part having a peripheral surface with a recording surface thereon;

magnetic coupling means on said other end of said main body for user-replaceably magnetically coupling said recording medium to the rotary shaft of said motor, said magnetic coupling means including means for supporting said main body along an axial direction of said tapered part when said recording medium is magnetically coupled to the rotary shaft of said motor; and preventing means for preventing the recording surface of said recording medium from making contact with an inner peripheral surface of said accommodating case, said preventing means being provided on at least one of said recording medium and said accommodating case.

2. A recording medium as claimed in claim 1 in which said preventing means comprises a flange part on at least one of the two ends of said main body, said flange part projecting radially outward around said central axis toward the inner peripheral surface of said accommodating case.

3. A recording medium as claimed in claim 1 in which said preventing means comprises a flange part on at least one of two ends of said accommodating case, said flange part projecting radially of said central axis toward the recording surface of said recording medium.

4. A recording medium which is user-replaceable for a recording and/or reproducing apparatus which comprises a rotational motor and recording and/or reproducing means, said motor including a rotary shaft, said recording and/or reproducing means including a recording and/or reproducing transducer, said recording medium being accommodated within an accommodating case which constitutes a cartridge together with said recording medium and being loaded into said recording and/or reproducing apparatus together with said accommodating case, said accommodating case comprising a window to which said recording and/or reproducing transducer enters and a guide part for guiding said accommodating case when said accommodating case is loaded into said recording and/or reproducing apparatus so that said window faces said recording and/or reproducing transducer in a loaded state of said accommodating case, said recording medium comprising:

a main body having opposite ends and including a hollow tapered part having a central axis, said tapered part being open at one of said ends of said main body, said main body having a diameter at said one open end which is greater than the diameter of said main body at the other end, said tapered part having a peripheral surface with a recording surface thereon; and magnetic coupling means on said other end of said main body for user-replaceably magnetically coupling said recording medium to the rotary shaft of said motor, said magnetic coupling means including means for supporting said main body along an axial direction of said tapered part when said recording medium is magnetically coupled to the rotary shaft of said motor.

5. A recording medium which is user-replaceable for a recording and/or reproducing apparatus which comprises a rotational motor, recording and/or reproducing means and rotation detecting means for detecting rotational position of said recording medium, said motor including a rotary shaft, said recording medium comprising:

a main body having opposite ends and including a hollow tapered part having a central axis, said tapered part being open at one of said ends of said main body, said main body having a diameter at said one open end which is greater than the diameter of said main body at the other end, said tapered part having a peripheral surface with a recording surface thereon, said main body comprising a mark part cooperating with said rotation detecting means of said recording and/or reproducing apparatus; and magnetic coupling means on said other end of said main body for user-replaceably magnetically coupling said recording medium to the rotary shaft of said motor, said magnetic coupling means including means for supporting said main body along an axial direction of said tapered part when said recording medium is magnetically coupled to the rotary shaft of said motor.

6. A recording medium as claimed in claim 5 in which said mark part of said main body comprises a hole for allowing light from a light-emitting element of said rotation detecting means to pass and reach a photosensitive element of said rotation detecting means.

7. A recording medium as claimed in claim 6 in which said recording medium is accommodated within an accommodating case to form a cartridge, and said accommodating case comprises a hole for allowing light to pass from said light-emitting element to said mark part.

8. A recording medium as claimed in claim 5 in which said mark part of said main body is a permanent magnet piece which cooperates with a magnetic pickup head of said rotation detecting means.

* * * * *